United States Patent
Lane

(10) Patent No.: US 10,707,462 B1
(45) Date of Patent: Jul. 7, 2020

(54) INTRACELLULAR DEVICE FOR LITHIUM ION BATTERIES

(71) Applicant: Manaflex, LLC, Waikoloa, HI (US)

(72) Inventor: Robert Clinton Lane, Waikoloa, HI (US)

(73) Assignee: MANAFLEX, LLC, Waikoloa, HI (US)

(*) Notice: Subject to any disclaimer, the term of this patent is extended or adjusted under 35 U.S.C. 154(b) by 0 days.

(21) Appl. No.: 16/553,220

(22) Filed: Aug. 28, 2019

(51) Int. Cl.
| | |
|---|---|
| *H01M 2/00* | (2006.01) |
| *H01M 2/10* | (2006.01) |
| *H01M 2/12* | (2006.01) |
| *H01M 2/20* | (2006.01) |
| *H01M 10/6554* | (2014.01) |
| *H01M 10/625* | (2014.01) |
| *H01M 10/0525* | (2010.01) |

(52) U.S. Cl.
CPC .......... *H01M 2/1077* (2013.01); *H01M 2/12* (2013.01); *H01M 2/206* (2013.01); *H01M 10/0525* (2013.01); *H01M 10/625* (2015.04); *H01M 10/6554* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 10,347,894 B2 | 7/2019 | Barton et al. | |
| 2012/0164490 A1* | 6/2012 | Itoi | H01M 2/105 429/7 |
| 2015/0228956 A1* | 8/2015 | Schussler | H01M 2/1077 429/94 |
| 2018/0034023 A1* | 2/2018 | Newman | H01M 2/1055 |
| 2018/0294536 A1* | 10/2018 | Kruszelnicki | H01M 10/625 |
| 2019/0296281 A1* | 9/2019 | Elsberry | H01M 2/0237 |
| 2019/0312251 A1* | 10/2019 | Matthews | H01M 2/204 |

* cited by examiner

*Primary Examiner* — Milton I Cano
*Assistant Examiner* — Mary G Henshaw
(74) *Attorney, Agent, or Firm* — Anthony King; WPAT Law

(57) ABSTRACT

A prefabricated collector in a lithium ion battery module where the collector has a plurality of wells each of which to receive a lithium ion battery cell and to act both as a gas barrier and a conductor of current.

23 Claims, 20 Drawing Sheets

INTRACELLULAR DEVICE FOR LITHIUM ION BATTERIES

FIELD OF THE DISCLOSURE

The present disclosure relates to a battery module and, more particularly, a battery module having an array of battery cells for electric vehicles.

BACKGROUND OF THE DISCLOSURE

A thermal runaway event is a known problem in lithium ion battery modules during repeated charge/discharge cycles. Those in the industry have been looking for solutions to minimize or prevent thermal runaway events, which can happen during fast charging (e.g., supercharging), collisions, environmental exposure (too hot), or it can happen spontaneously.

There is a continuing need for new ways to minimize or prevent thermal runaway events in battery modules.

The disclosed embodiments may seek to effectuate one or more of the desired outcomes discussed in this disclosure. Although the present embodiments may obviate one or more of those mentioned desired outcomes, it should be understood that some aspects of the embodiments might not necessarily obviate them.

All referenced patents, applications and literatures are incorporated herein by reference in their entirety. Furthermore, where a definition or use of a term in a reference, which is incorporated by reference herein, is inconsistent or contrary to the definition of that term provided herein, then the definition of that term provided herein applies and the definition of that term in the reference does not apply.

BRIEF SUMMARY OF THE DISCLOSURE

In a general implementation, the contemplated battery module includes a first thermally conductive substrate having a top surface, an array of wells disposed on at least one side of the first substrate, and a plurality of battery cells each of which is at least partially enveloped within each of said well of the plurality of wells.

In another aspect combinable with the general implementation, at least one of the wells has a side wall that makes physical contact with a side wall of each battery cell so as to transfer heat from said battery cell to the first substrate.

In another aspect combinable with the general implementation, each battery cell has a side wall and the entire length of each battery cell's side wall can be enclosed within each well. Or in other embodiments, the battery cell is only partially or substantially enclosed within each respective well.

In another aspect combinable with the general implementation, at least one of the battery cells is adhered inside of a well via an adhesive and makes indirect contact with a side wall of the well so as to transfer heat from said battery cell to the first substrate.

In another aspect combinable with the general implementation, there can be a cell interconnect disposed above or directly on the first substrate and is electrically connected to the plurality of battery cells.

In another aspect combinable with the general implementation, there can be a venting space disposed above the plurality of battery cells. In some embodiments, the venting space can be an enclosed venting space having a port.

In another aspect combinable with the general implementation, there can be a first terminal electrically coupled to the first cell interconnect.

In another aspect combinable with the general implementation, there can be a first terminal electrically coupled to the first substrate.

In another aspect combinable with the general implementation, there can be a second thermally conductive substrate coupled to the first substrate, a layer of dielectric and thermally conductive material disposed between said first substrate and said second substrate, and a second terminal electrically coupled to the second substrate.

In another aspect combinable with the general implementation, the first substrate and the second substrate can be made of an electrically conductive material, and both the first terminal and the first cell interconnect can be electrically coupled to the first substrate.

In another aspect combinable with the general implementation, the electrically conductive material of the first and second substrates can be metal foam, and the layer of dielectric and thermally conductive material can be ceramic or a high temperature polymer.

In another aspect combinable with the general implementation, the metal foam can be a closed-cell or open-cell aluminum metal foam.

In another aspect combinable with the general implementation, the first substrate can be an open-cell metal foam having interconnecting cells and there can be a thermal exchange medium within the interconnection cells.

In another aspect combinable with the general implementation, there can be a fluid inlet and a fluid outlet disposed on the first substrate and the first substrate can have at least one fluid channel or at least one chamber disposed within it. The contemplated fluid channel can be fluidly-connected to the interconnecting cells.

In another aspect combinable with the general implementation, the first substrate itself can act as a gas barrier such that a portion of each battery cell enveloped within each well is prevented from exposure to gas, which is from the venting space.

In another aspect combinable with the general implementation, the gas barrier layer can be a layer of ceramic or a high temperature polymer covering at least the top surface of the first substrate.

In another aspect combinable with the general implementation, the gas barrier layer can be a layer that is separable from the first substrate and can be disposed on top of, or below, the interconnect to isolate the side walls of each battery cell from the venting space to minimize gas impingement.

In another aspect combinable with the general implementation, the substrate itself can act as a collector for an array of battery cells.

In another aspect combinable with the general implementation, there can be a heat exchanger coupled to the first substrate, the second substrate, or both.

In another aspect combinable with the general implementation, there can be more than two thermally conductive substrates coupled together to form a battery module; there can be at least one thermal barrier disposed at appropriate places between some of the substrates to achieve certain types of temperature isolation.

In another general implementation, this is a contemplated method of protecting battery cells contained within a battery module, or a contemplated method of manufacturing a battery module with various desired properties. The general implementation includes prefabricating a collector from a thermally conductive material and prefabricating a plurality of wells in this collector. Each of these wells can receive a battery cell.

In another aspect combinable with the general implementation, the novel method can include the step of providing a structure to isolate at least a substantial portion of the side wall of each battery cell from a venting space to prevent gas impingement on an intercellular space.

In another aspect combinable with the general implementation, the novel method can include the step of transferring heat from each battery cell to a thermal exchange medium via the collector by providing sufficient contact between each battery cell and a wall of each well.

In another aspect combinable with the general implementation, the novel method can include using a collector that is also electrically conductive; the method can include using the collector as part of a current pathway during a charge/discharge cycle.

In another aspect combinable with the general implementation, the novel method can include the step of structurally protecting the battery cells by enclosing each battery cell with a shock-absorbing material. In one embodiment, the shock-absorbing material is a metal foam.

In another aspect combinable with the general implementation, the novel method can include a prefabrication step to cover the metal foam with a thermally conductive, dielectric material, such as ceramic or a high temperature polymer.

In another aspect combinable with the general implementation, the novel method can include the step of coupling a heat exchanger to the collector/substrate.

In another aspect combinable with the general implementation, the novel method can include the step of enclosing a phase-changing fluid in the interconnecting cells of the metal foam and allowing at least a portion of the phase-changing fluid to evaporate from the interconnecting cells during a thermal runaway event.

In another aspect combinable with the general implementation, the novel method can include the step of coupling a fluid inlet and outlet to the collector, thereby allowing a thermal exchange medium to flow through the collector via conduits in the collectors, chambers in the collectors, interconnecting cells in the collectors, or a combination of these options.

In another aspect combinable with the general implementation, the novel method can include the prefabrication step of partitioning the collector with a layer of dielectric material, or a layer of thermal barrier, or both.

In another aspect combinable with the general implementation, the novel method can simplify the assembly of a battery module in that a collector with an array of wells is provided to receive an array of battery cells, thereby obviating the need of fixing the array of battery cells in place followed by carefully gluing the array of battery cells onto a cold plate. In other words, the novel method can facilitate a high volume pick and place of the battery cells.

Accordingly, the present disclosure is directed to a battery module or a method of manufacturing a battery module that substantially obviates one or more problems due to limitations and disadvantages of the related art.

While this specification contains many specific implementation details, these should not be construed as limitations on the scope of what may be claimed but rather as descriptions of features specific to particular implementations of particular inventions.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

Figure 1:
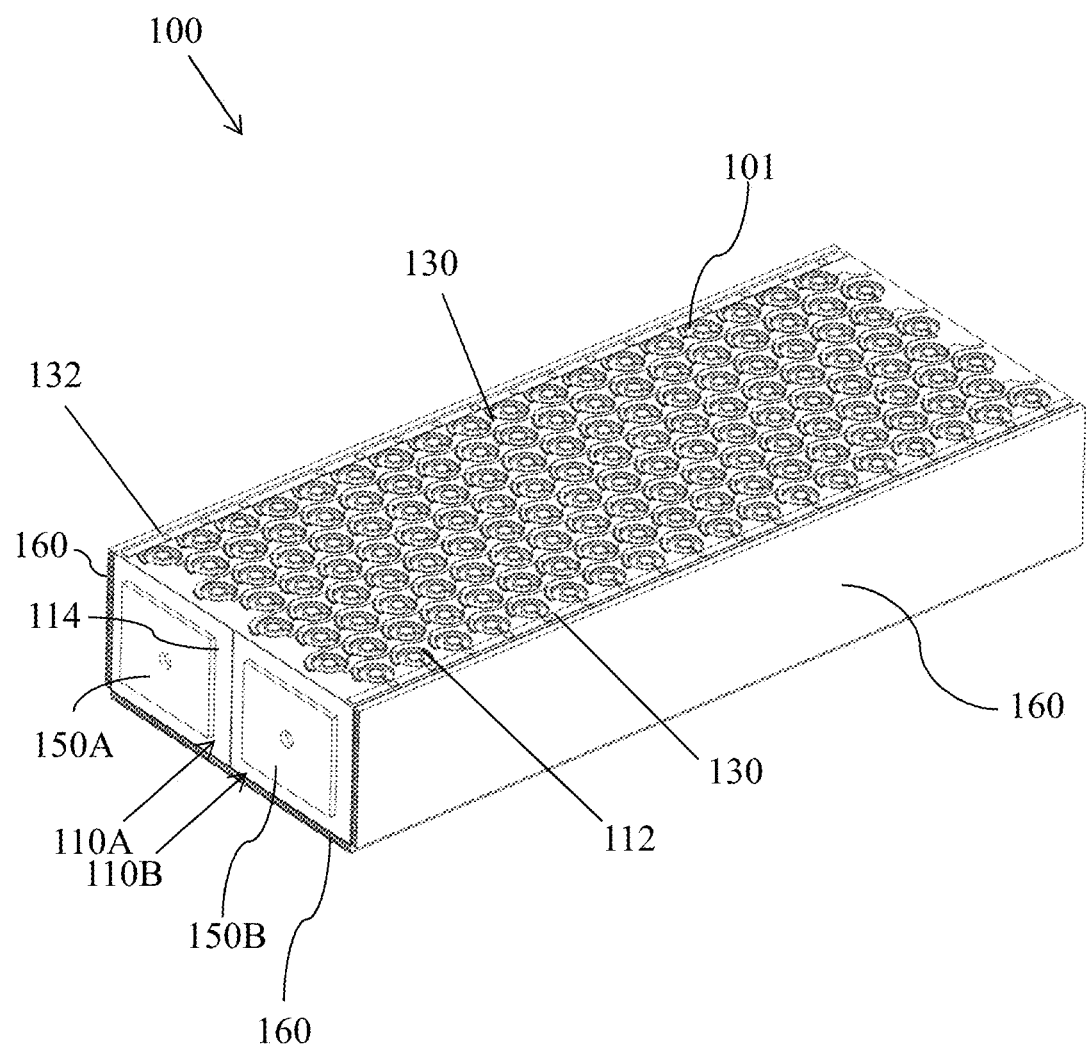
FIG. 1 is a top front perspective view of an embodiment of a battery module according to an aspect of the disclosure.

The following call-out list of elements in the drawing can be a useful guide when referencing the elements of the drawing figures:

100 Battery module
101 Battery cell
101A Front half array of battery cells
101B Rear half array of battery cells
102 Venting space
103 Port
110 Substrate
110A Substrate
110B Substrate
110C Substrate
110D Substrate
110E Substrate
110F Substrate
110G Substrate
110H Substrate
110J Substrate
112 Well
113 Side wall of the well
114 Front surface
115 Rear surface
116 Top surface
117 Bottom surface
118 Side surface
119 Dielectric and thermal conductive layer
120 Close cell
121 Open cell
122 Ceramic sphere
123 Thermal insulation layer
124 Metal
130 Cell interconnect
130A Cell interconnect
130B Cell interconnect
130C Cell interconnect
130D Cell interconnect
130E Cell interconnect
130F Cell interconnect
130G Cell interconnect
130H Cell interconnect
130I Cell interconnect
130J Cell interconnect
130K Cell interconnect
130L Cell interconnect
130M Cell interconnect
130N Cell interconnect
130P Cell interconnect
130Q Cell interconnect
132 Weld point
134 First interconnect
136 Second interconnect
137 Positive terminal of the battery cell
138 Negative terminal of the battery cell
142 Gas-barrier layer
150A Negative terminal of the battery module
150B Positive terminal of the battery module
160 Heat exchanger
161 Polymeric plug
162 Thermal exchange medium
164 Fluid inlet
166 Fluid outlet
167 Channel
168 Chamber
171 Adhesive layer

DETAILED DESCRIPTION OF THE EMBODIMENTS

The different aspects of the various embodiments can now be better understood by turning to the following detailed description of the embodiments, which are presented as illustrated examples as defined in the claims. It is expressly understood that the embodiments as defined by the claims may be broader than the illustrated embodiments described below.

The inventor has created a novel method to hold and protect each battery cell in a battery module by prefabricating a collector using certain material of ideal properties and characteristics. The collector can have an array of wells, each of which to envelope and hold a lithium ion battery cell. By partially or fully enveloping the side wall of each battery cell, gas impingement to the battery cells or to the intercellular region can be prevented or minimized.

In one aspect, this collector can be made of a block of thermally conductive material and can effectively transfer heat from the battery cells to a heat exchanger, thereby minimizing or preventing the occurrence of thermal runaway. In another aspect, this collector can effectively minimize or prevent the occurrence of thermal runaway in battery cells that are adjacent to a cluster of battery cells that have already gone into thermal runaway.

Throughout this disclosure, this block of thermally conductive material is also referred to as a substrate or a subassembly of substrates. A collector may be comprised of at least two such substrates. Alternatively, a collector may be comprised of a single substrate partitioned (with a dielectric material) into different regions.

As used herein, the term "substrate" 130 refers to a substance or a backbone to which various parts (e.g., cell interconnect 130, battery cells 101) of the battery module are coupled to or attached. It can be a base or a holder for battery cells 101. The substrate can be rigid or semi-rigid. The substrate can also be pre-fabricated before other parts (e.g., cell interconnect 130, battery cells 101) of the battery module 100 are attached to it. The substrate can include a porous material. The substrate can be a block of the desired material but not all embodiments require the substrate to be a solid block of material. Also contemplated is to use the same material to prefabricate a matrix or lattice having wells or holding frames to receive an array of battery cells. The matrix can effectively wrap each battery cell and can function as a gas barrier, a thermal conductor, and/or an electrical conductor.

In some instances in this disclosure, the term substrate 110 is used interchangeably with the term collector. One contemplated function of the collector is to act as a structural backbone to safely support other components of the battery module 100.

Optionally, the collector can be made of a foam-like material having open cells or closed cells. These cells within the collector can retain a thermal exchange medium, such as water or ethylene glycol, to effectuate cooling in the battery module 100. In some embodiments the thermal exchange medium moves through the collector from an inlet to an outlet, which will be described in more detail later.

As mentioned briefly above, the collector can be electrically conductive and can be partitioned internally with a dielectric material such that the collector itself provides a particularly designed passage pattern/map for current during a charge/discharge cycle.

Contemplated material for the collector can preferably have an electrical resistivity as low as possible. Contemplated material for the collector can preferably have a thermal conductivity as high as possible. In some embodiments, the contemplated material for the collector can have a thermal conductivity higher than 30 w/mk. In one embodiment, the contemplated material can have a thermal conductivity of about 40 w/mk. In one other embodiment, the contemplated material can have a thermal conductivity higher than 50 w/mk. In another embodiment, the contemplated material can have a thermal conductivity higher than 120 w/mk. In still another embodiment, the contemplated material can have a thermal conductivity higher than 180 w/mk. In a further embodiment, the contemplated material can have a thermal conductivity higher than 220 w/mk. Contemplated material for the collector can preferably have a density as low as possible. In some embodiments, the density of the material is 200-700 kg/m$^3$. In some embodiments, the density of the material should have a low impact on module energy density. Contemplated material for the collector can preferably have a structural strength as high as possible. The contemplated material for the collector can have a melting temperature of about 600 degrees Celsius. Another contemplated material for the collector can have a melting temperature higher than 800 degrees Celsius. In another embodiment, the contemplated material can have a melting point higher than 900 degrees Celsius. In still another embodiment, the contemplated material can have a melting point higher than 1000 degrees Celsius. One contemplated material for the collector can have a melting temperature between 600 and 1000 degrees Celsius.

Further, as will be described in more detail later, the collector or the substrate can be partitioned internally with a thermal insulation material such that the collector itself provides a particularly designed passage for heat.

The contemplated collector can additionally provide sufficient structural integrity to the battery module 100 to prevent or minimize rupturing of individual battery cells 101 in a vehicle collision.

It is important to appreciate that although the disclosed configuration of a generally rectangular shaped collector is particularly well suited for use in electric vehicles, other shapes and sizes are also contemplated. In most embodiments, each well 112 is electrically insulated from each perspective battery cell 101 by a layer of dielectric material. This dielectric material can be a sealant covering the substrate 110 (which will be discussed in more detail later), an adhesive that bonds the battery cell 101 in the well 112, or both.

The contemplated collector/substrate 110 can be made of suitable materials to withstand temperature extremes and the chemical environment typical of a lithium ion battery module; such materials include natural and synthetic polymers, various metals and metal alloys, naturally occurring materials, textile fibers, and all reasonable combinations thereof. In one particular embodiment, the material is metal foam. In yet another embodiment, the material can be aluminum metal foam or nickel metal foam. In a further embodiment, this material is aluminum open-cell metal foam with a pore radius equal to or smaller than 1 mm. In yet a further embodiment, this material is aluminum closed-cell metal foam with a pore radius of about 1 mm to 5 mm. Still another embodiment includes aluminum alloy embedded with ceramic or glass spheres, both of which will be described in more detail later. In a further embodiment, this material can be a nanostructured foam made of carbon nanotubes. Contemplated melting temperature for the suitable material can be more than 1000 degrees Celsius, or more than 800 degrees Celsius, or more than 600 degrees Celsius, or a temperature higher than thermal runaway temperature.

In most embodiments, the material for the substrate 110 can be structurally ductile so as to minimize shattering upon impact.

Figure 4:
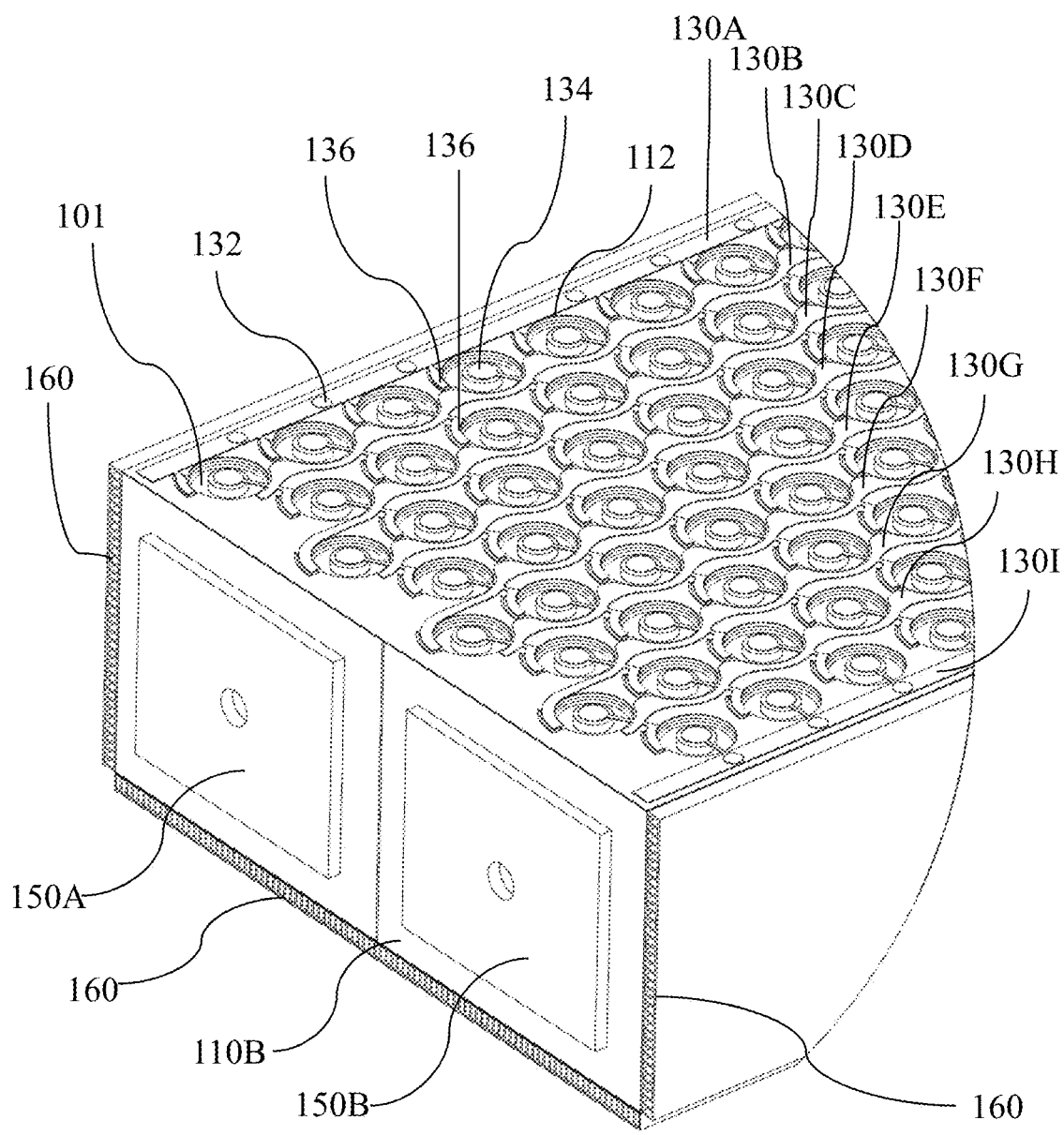
FIG. 4 is a close-up view of the top view of the battery module of FIG. 1, according to an aspect of the disclosure.

FIG. 1 generally depicts the architecture of one embodiment of the battery module 100. The contemplated battery module 100 can have two thermally conductive substrates 110A, 110B each of which having a top surface 116 (as shown in FIG. 4). Here, the two substrates 110A, 110B are arranged side by side. As will be seen later in this disclosure, other arrangements of the substrates 110 are also contemplated.

Figure 5:
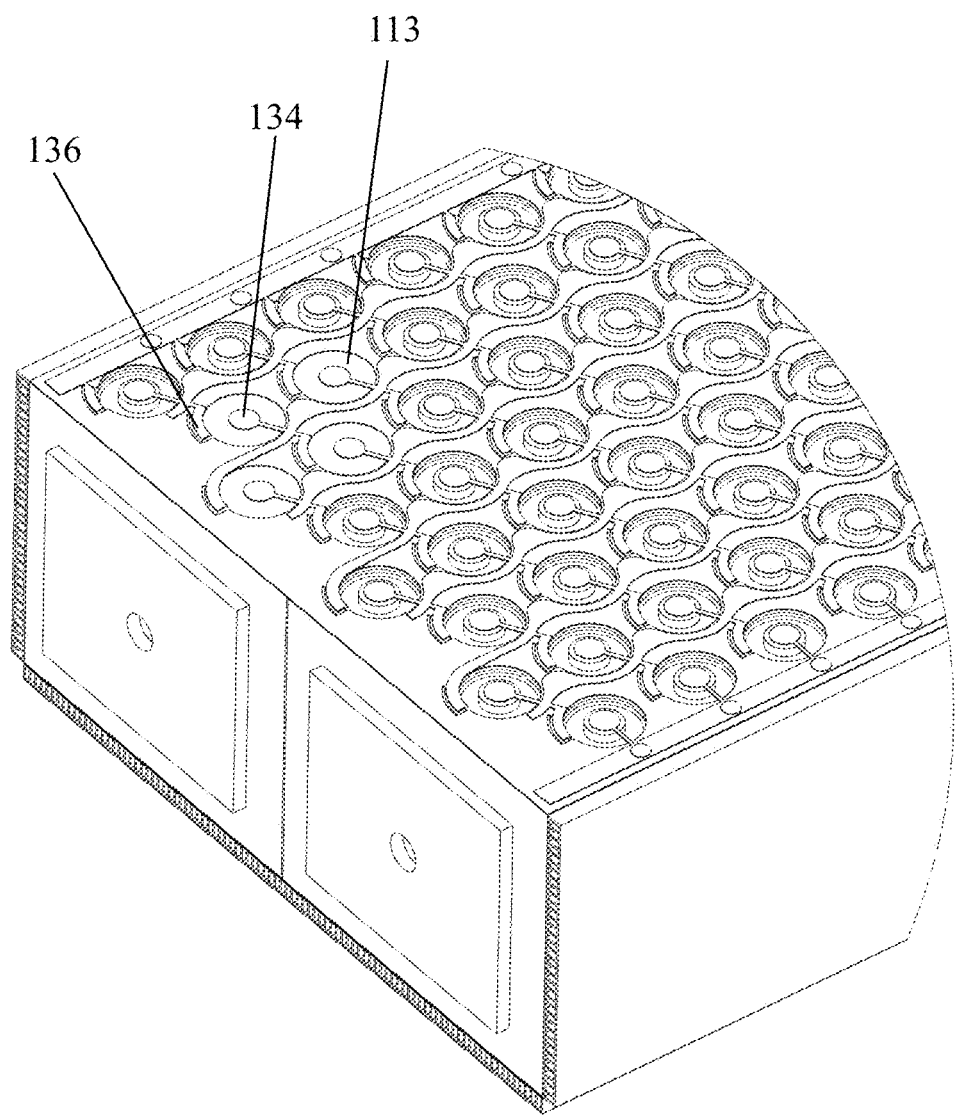
FIG. 5 is a close-up view of the top view of the battery module of FIG. 1 wherein four wells are shown as empty, according to an aspect of the disclosure.

There can be an array of wells 112 disposed on the top side of the two substrates 110A, 110B. Each well 112 can have a wall 113 (as shown in FIG. 5) and is shown to have a cylindrical shape. The cylindrical shape of the well 112 conforms to the size and shape of the respective battery cell 101 designed to be received within each well 112.

When the shape of the well 112 conforms to the size and shape of the battery cell 101, the physical contact between the wall 113 of the well 112 and the side wall of the battery cell 101 can be maximized, thereby improving transfer of heat from the battery cell 101 to the substrate 110. In some embodiments, the battery cells 101 are placed into the wells 112 without the use of thermally-conductive adhesives or any other thermally-conductive substance. In yet other embodiments, each well 112 is prepped with a drop or a spray of a right amount of thermally-conductive adhesives before a battery cell 101 is dropped into its respective well 112.

The contemplated substrates 110A, 110B offer an easy drop-and-place process in battery production. As mentioned above, thermally-conductive adhesive may or may not be necessary. In one embodiment, the thermally-conductive adhesive can be a gas barrier to minimize gas impingement on a battery cell 101. In other embodiments, no adhesive is used to ensure easy removal of battery cells 101 at a later time.

The cross-sectional shape of the well 112 can be other than circular. Also, the cross-sectional shape of the well 112 does not have to conform to the size and shape of the battery cell 101. In such instances, the right amount of thermally-conductive adhesive placed in each well 112 would ensure sufficient contact between the wall 113 of each well 112 and the side wall of each battery cell 101, thereby improving transfer of heat from each battery cell 101 to the substrate 110A, 110B.

The thermally-conductive adhesive can be a type that operates well under temperature extremes and acidic environments. This adhesive can also be used to bond various other parts to the substrate 110A, 110B as will be described later in this disclosure.

Contained within the plurality of wells 112 is a plurality of battery cells 101. Here, as shown in FIG. 1, each battery cell 101 is fully enveloped within each well 112. Although this particular embodiment contemplates having each battery cell 101 fully enveloped within each well 112, other embodiments are also contemplated where the battery cells 101 are partially enveloped within the wells 112. In other words, the depth of the well 112 can vary. A shallower well 112 that leaves part of a battery cell's side wall 113 exposed may still sufficiently protect the battery cell 101 from gas impingement and at the same time effectively transfer heat.

In one particular embodiment, the exposed percentage area of a battery cell's side wall is designed to be sufficiently low to prevent or minimize thermal runaway events, which can result gas impingement on battery cells 101 through each battery cell's exposed side wall. Exposure of a battery cell's side wall in this instance is defined as a portion of a battery cell's side wall that is not covered by a gas barrier substance. In one embodiment, the exposed percentage area of a battery cell's side wall is no more than 50% of the entire side wall. In another embodiment, the exposed percentage area of a battery cell's side wall is no more than 30% of the entire side wall. In yet another embodiment, the exposed percentage area of a battery cell's side wall is no more than 10% of the entire side wall. In one further embodiment, the exposed percentage area of a battery cell's side wall is no more than 5% of the entire side wall.

Disposed above the array of battery cells 101 is a layer of cell interconnects 130, the detail of which will be describe later.

Figure 25:
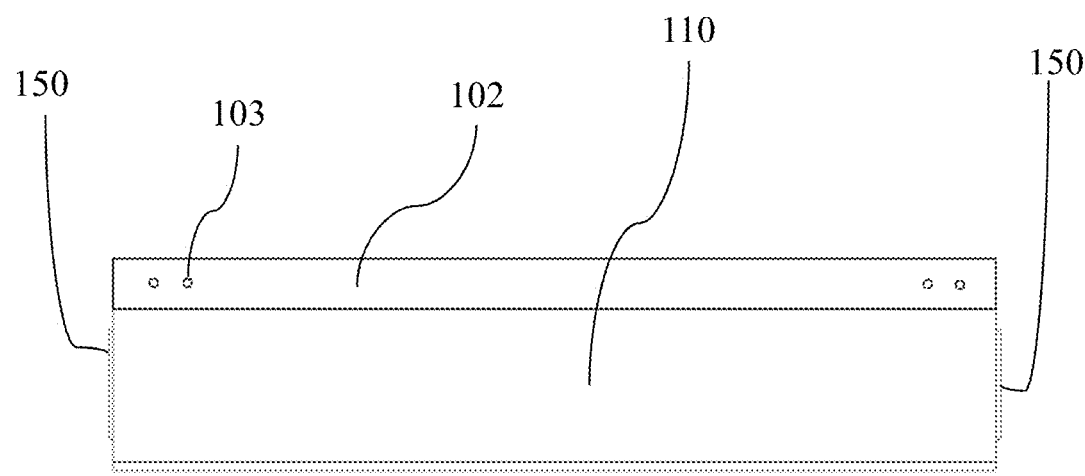
FIG. 25 is a side view of the contemplated battery module having a venting space, according to an aspect of the disclosure.

As is known in the art, there can be a venting space 102 (as shown in FIG. 25) disposed above the substrate 110. The contemplated venting space 102 can be an enclosed space. When a battery cell 101 goes into a thermal event, a gas may be released from the top side of that particular battery cell 101 into the venting space 102. There can be ports 103 that open to the outside of the battery module 100, allowing the gas to escape from the venting space 102.

There can be a positive terminal 150B and a negative terminal 150A on the battery module 100. In FIG. 1, a negative terminal 150A is disposed adjacent to the positive terminal 150B. Both terminals 150A, 150B are disposed on the front surface 114 of the substrate 110. The terminals 150A, 150B are respectively electrically coupled to the front surface 114 of substrates 110A, 110B, both of which are electrically conductive.

Heat generated from the battery cells 101 can be transferred to the substrates 110A, 110B; the heat can next be transferred to the optional heat exchangers 160. These heat exchangers 160 can be in different shapes and forms. Here in FIG. 1, heat exchanger 160 is a low thermal resistance cooling plate attached to the side surfaces 118 and bottom surface 117 of the substrate subassembly comprised of substrates 110A, 110B.

Figure 2:
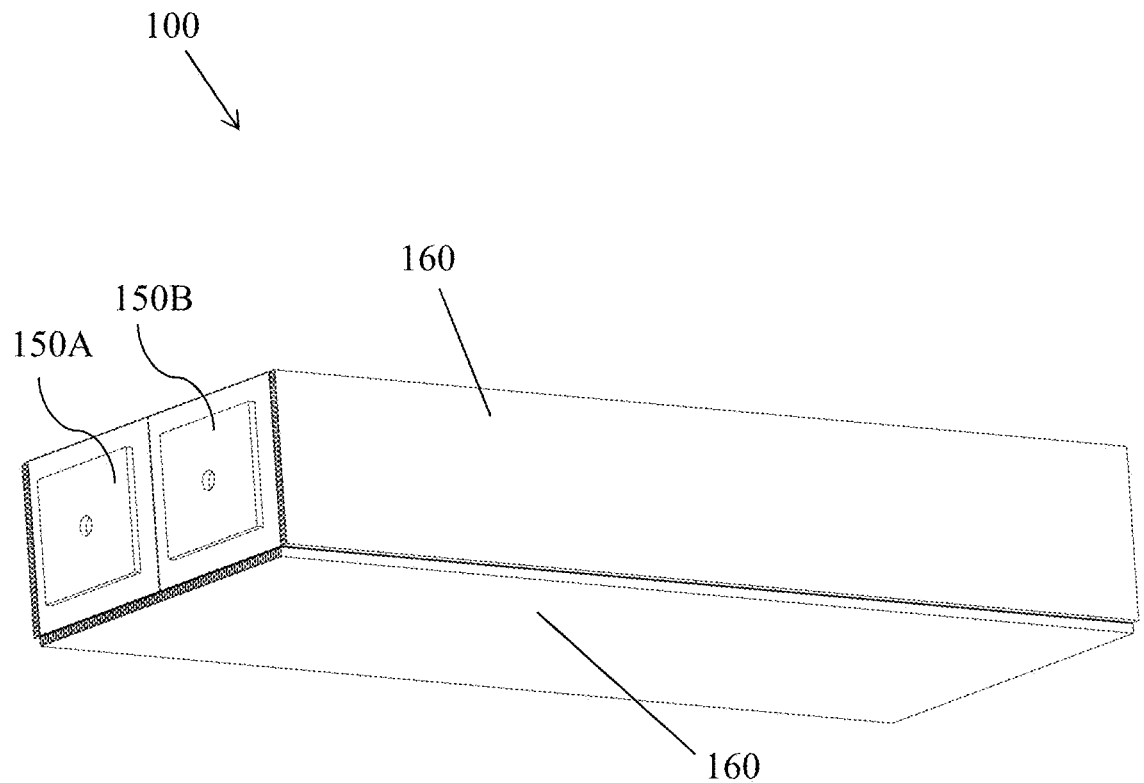
FIG. 2 is a bottom front view of the battery module of FIG. 1, according to an aspect of the disclosure.

FIG. 2 shows the bottom side of battery module 100 with a cooling plate 160 attached thereon. These cooling plates 160 may be attached to the substrates 110A, 110B via thermally conductive adhesives or other known means. In most embodiments, no current should pass from the substrates 110A, 110B to the cooling plates 160. This can be achieved by providing a seal or a covering layer of dielectric material over some or all surfaces of the substrates 110A, 110B. Contemplated sealing material includes ceramic, a high temperature polymer, a silicon encapsulant, or any combination thereof. Alternatively or additionally, this can be achieved by using a dielectric thermally-conductive adhesive between the substrates 110A, 110B and the cooling plate 160. Contemplated sealant or coating can have a dielectric strength of at least 4 kv/mm. Contemplated sealant can be applied to the substrates 110A, 110B in a dipping process. In one contemplated manufacturing process, multiple substrates 110A, 110B are individually sealed with the dielectric material before bonding them together with a high temperature dielectric adhesive (thereby forming a subassembly), followed by removing the sealant at certain particular locations to expose the conductive material underneath. The exposed conductive material can then be fused to other components such as cell interconnects 130A, 130I, and terminals 150A, 150B.

In one contemplated embodiment, the substrates 110A, 110B can be prefabricated by taking a block of aluminum foam (having an array of wells) and sealing or covering the entire surface of the substrate 110 with ceramic or other suitable dielectric sealant. In some embodiments, the covering/coating of ceramic can be about 0.5 mm from the surface of the metal foam. In another embodiment, the thickness of the coating can be between 0.2 mm and 0.7 mm. In yet another embodiment, the thickness of the coating can be between 0.5 mm and 1.0 mm. Contemplated sealant also includes a silicon-based sealant.

The sealant on the outside of the substrate 110 can tolerate a temperature in excess of 1000 degree Celsius. The sealant can function as a gas barrier to minimize or prevent gas impingement on the battery cells 101 enclosed in the wells 112.

Contemplated metal foam prior to sealing with the ceramic can have a density of about 300-600 kg/m3. While the embodiments discussed above provide that the metal foam can be sealed on its surfaces, another embodiment provides that the ceramic can seal further down into the internal cells of the metal foam; the contemplated density can be less than 1000 kg/m3. One way to control the penetration depth of the ceramic is to use the closed cell metal foam with smaller pores.

In some embodiments, the sealed ceramic layer individually covering the substrates 110A, 110B ensures that current does not directly pass from one substrate 110A to an adjacent substrate 110B when they touch. Optionally or additionally, a separate layer of dielectric material can be placed between the substrates 110A, 110B to ensure no direct passage of current from one substrate 110A to an adjacent substrate 110B when they touch. In essence, a single collector having multiple substrates 110A, 110B can be electrically partitioned.

The need for electrical partitions is to provide a designated current path/map.

A substrate subassembly can also be thermally partitioned. In some particularly contemplated embodiments, a thermal barrier such as a ceramic wool plate can be placed in between the substrates 110 in a subassembly to form a thermal break. The thermal barrier can confine the propagation of heat beyond a certain number of battery cells 101, or direct the propagation of heat in a certain direction or route.

Figure 3:
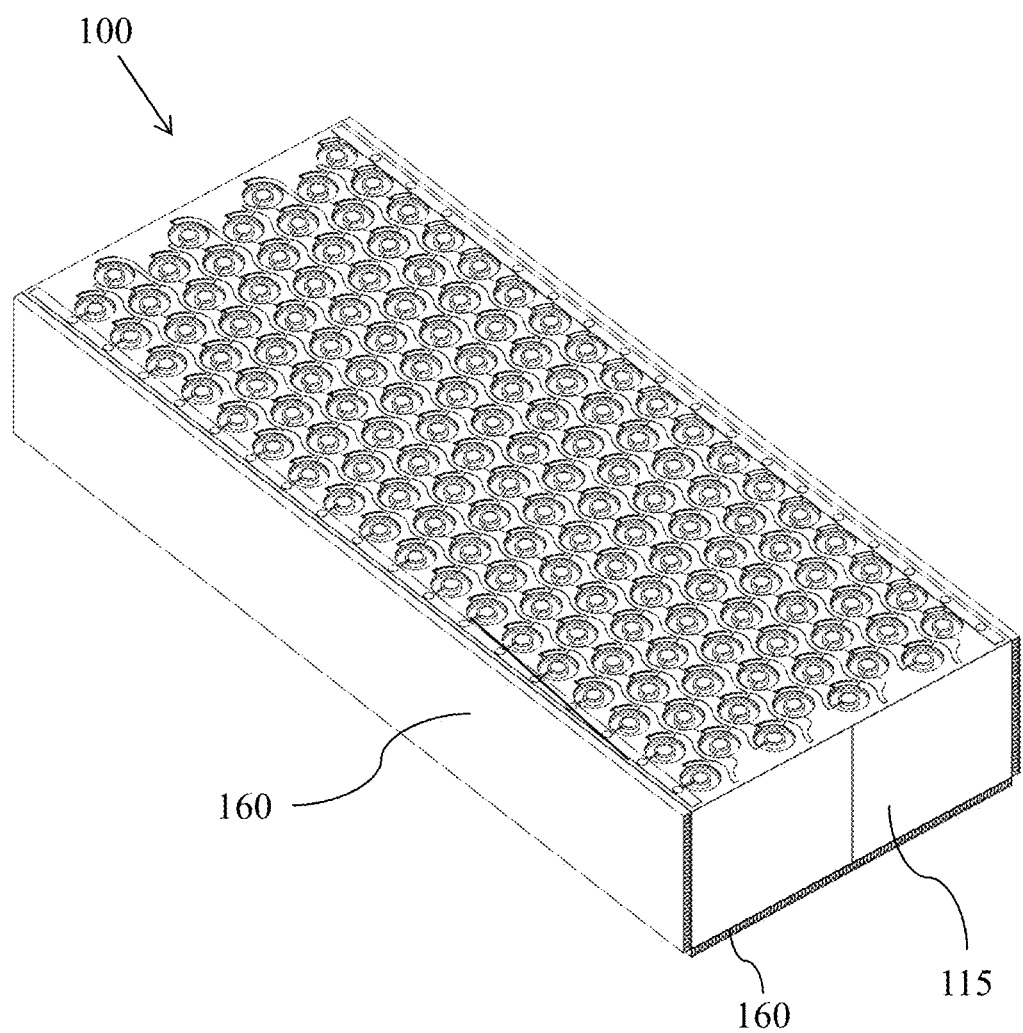
FIG. 3 is a top rear perspective view of the battery module of FIG. 1, according to an aspect of the disclosure.

FIG. 3 shows the back side of the battery module 110. Although in this embodiment no terminals 150A, 150B are provided on the back side, one skilled in the art would recognize that terminals 150A, 150B may be placed elsewhere on the battery module to suit one's needs.

FIG. 4 provides a close-up view of the layer of cell interconnects 130. In the embodiment shown in FIGS. 1-7, the layer of cell interconnect 130 is actually comprised of nine separate interconnects 130A, 130B, 130C, 130D, 130E, 130F, 130G, 130H, 130I. As can be seen in FIG. 4, these nine interconnects 130A, 130B, 130C, 130D, 130E, 130F, 130G, 130H, 130I do not physically touch each other. Cell interconnect 130A is a strip of foil electrically connected to the substrate via weld points 132 and has a second interconnect 136 portion electrically connected to the negative terminals of the first row of battery cells 101 by physically touching the periphery of the top sides of the first row of battery cells 101. Cell interconnect 130B is a strip of foil having a first interconnect 134 portion electrically connected to the positive terminals 137 of the first row of battery cells 101. Cell interconnect 130B also has a second interconnect 136 portion electrically connected to the negative terminals of the second row of battery cells 101 by physically touching the periphery of the top sides of the second row of battery cells 101. Each of cell interconnect 130C, 130D, 130E, 130F, 130G, 130H are designed similarly as interconnect 130B, electrically connecting one brick of battery cells 101 to the next brick of battery cells 101. Cell interconnect 130I is similar to interconnect 130A because it electrically connects a last brick of battery cells 101 to the substrate 110B via weld points. The concept of the cell interconnect 130 is known in the art and is disclosed in U.S. Pat. No. 10,347,894, which is herein incorporated by reference in its entirety.

In FIG. 5, four battery cells 101 are missing from their respective wells 112. This is to illustrate the exposed side wall 113 of the well 112. In this particular illustrated example, the side wall 113 of the well 112 is as high as the battery cell 101.

In one contemplated embodiment, the material of the substrate 110 can act as a gas barrier. Therefore, by enclosing a battery cell 101 inside a well 112, the substrate 110 acts as an effective gas barrier to prevent or minimize the side wall of the battery cell 101 from exposure to the venting space 102.

Figure 6:
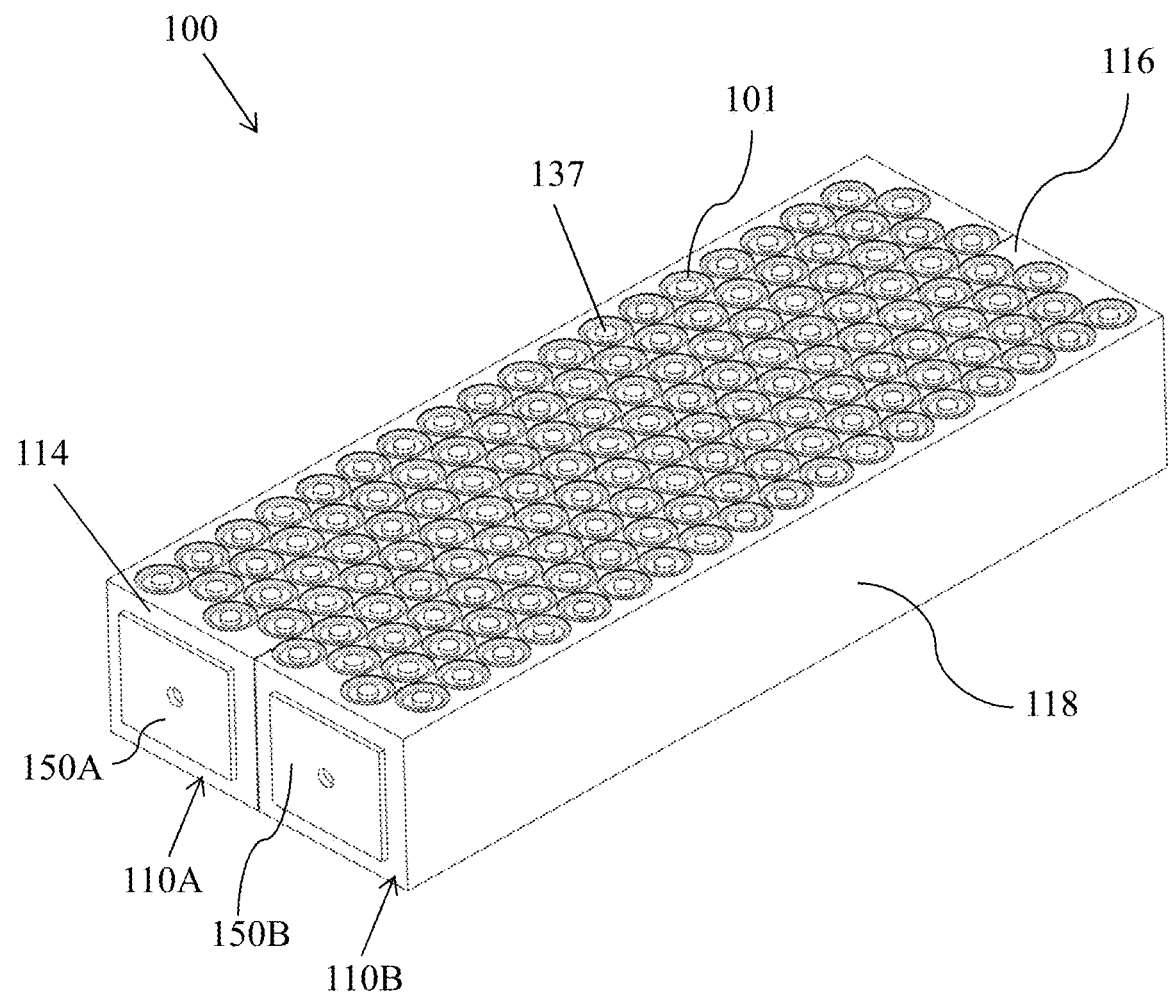
FIG. 6 is a top front perspective view of the battery module of FIG. 1 without the heat exchangers, according to an aspect of the disclosure.

Referring now to FIG. 6, a prefabricated collector having two adjacent substrates 110A, 110B is shown. An array of battery cells 101 have been dropped into the prefabricated collector, and cell interconnects 130A-I has yet to be installed onto the substrates 110A, 110B. The cooling plate 160 has yet to be attached to the side surface 118 of the substrates 110A, 110B. In one example of the prefabricated collector, the terminals 150A, 150B have been installed.

Figure 7:
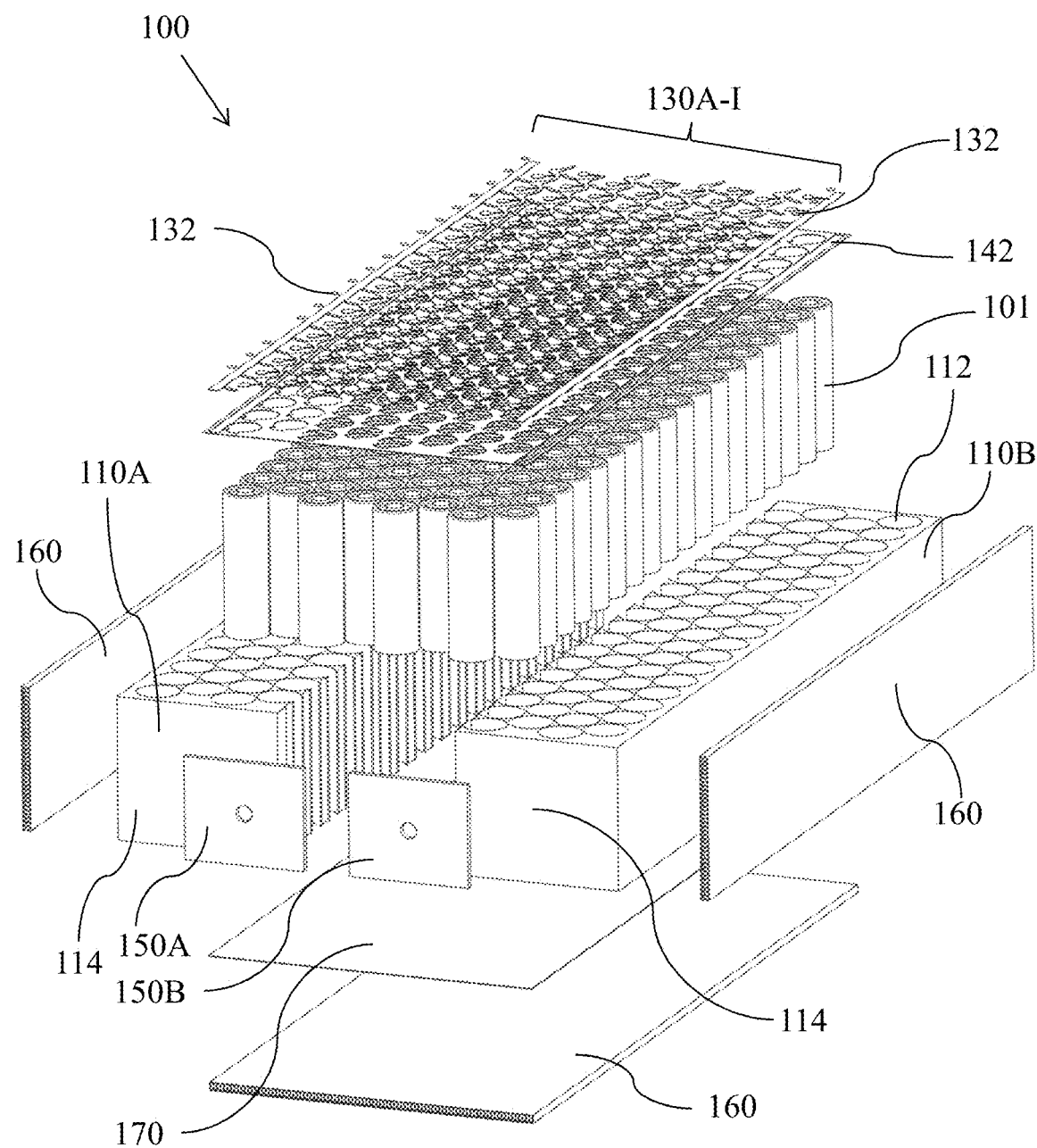
FIG. 7 is an exploded view of the battery module of FIG. 1, according to an aspect of the disclosure.

FIG. 7 shows an exploded view of the battery module 100. In this embodiment, the two substrates 110A, 110B can be prefabricated out of aluminum foam and individually sealed with ceramic or other thermally-conductive and dielectric materials. The two substrates can then be adhered to each other with a thermally-conductive adhesive thereby forming a subassembly. The battery cells 101 are then dropped into the wells 112, whether with or without a drop of adhesive in each well 120 to secure each respective battery cell 101 therein.

In this figure an optional gas-barrier layer 142 can be provided between the cell interconnect 130 and the array of battery cells 101. The contemplated gas-barrier layer 142 can be a high temperature flame retardant stiffener providing support to the interconnect 130. The contemplated gas-barrier layer 142 can also be an electrical insulator.

Also, a thermally conductive but electrically insulating adhesive layer can be provided between the heat exchanger 160 and the bottom side of the substrates 110D, 110E.

During battery charging, current enters the battery module 100 through the negative terminal 150A on the left. Although the substrate 110A on the left is sealed with a dielectric ceramic material on the outside, the negative terminal 150A on the left is directly connected to the metal portion of the substrate 110A through the dielectric ceramic covering. The current next travels to the substrate 110A on the left, without reaching any of the battery cells 101. This is because the walls of the battery cells 101 are electrically insulated from the substrate 110A due to the dielectric ceramic seal in the wells 112 and elsewhere on the substrate 110A. The current then travels to the cell interconnect 130A via a row of weld points 132 electrically attached to the substrate 110A on the left.

The current next travels from cell interconnect 130A to the first row of battery cells 101 and to cell interconnect 130B, as previously described and illustrated in FIG. 4. As current travels from cell interconnect 130I to substrate 110B on the right and then out through the positive terminal 150B on the right.

Figure 11:
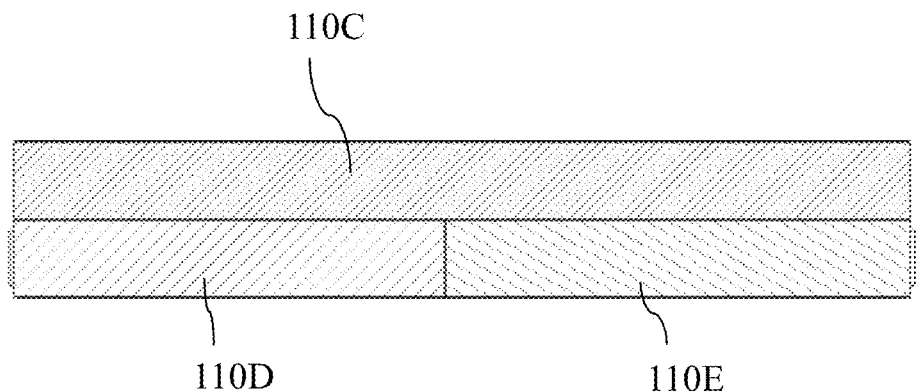
FIG. 11 is a side view of the three substrates from the battery module of FIG. 8 wherein the heat exchangers are removed, according to an aspect of the disclosure.

FIGS. 8-13 offer another embodiment where the collector is comprised of three substrates 110C, 110D, 110E individually sealed and then adhered to each other. The collector has a larger substrate 110E on top of two smaller adjacent substrates 110D, 110E (as shown in FIG. 11). Note that only a single layer of battery cells 101 are enclosed in this collector of three substrates 110C, 110D, 110E.

Figure 8:
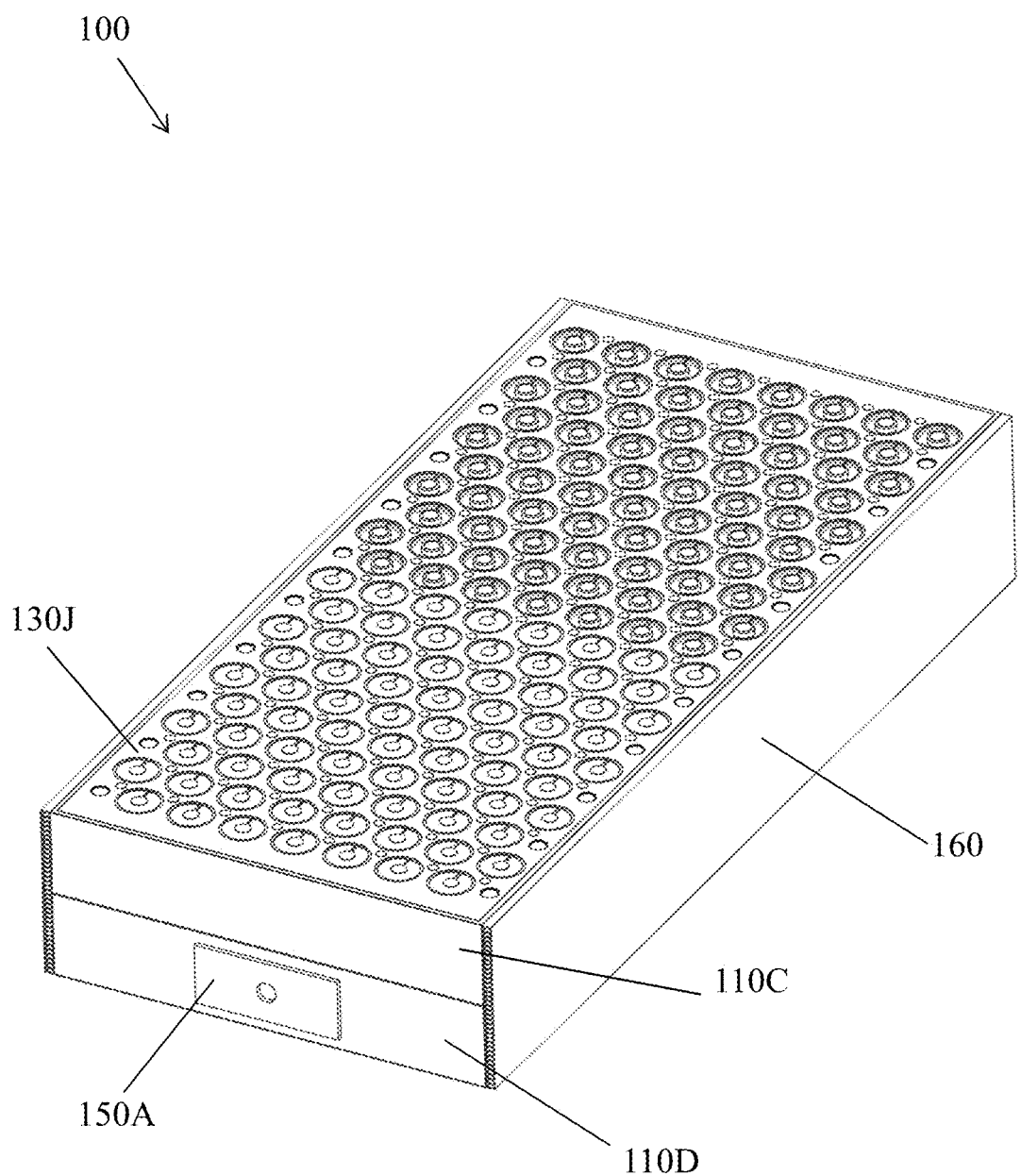
FIG. 8 is a top front perspective view of another embodiment of a battery module according to an aspect of the disclosure.
Figure 9:
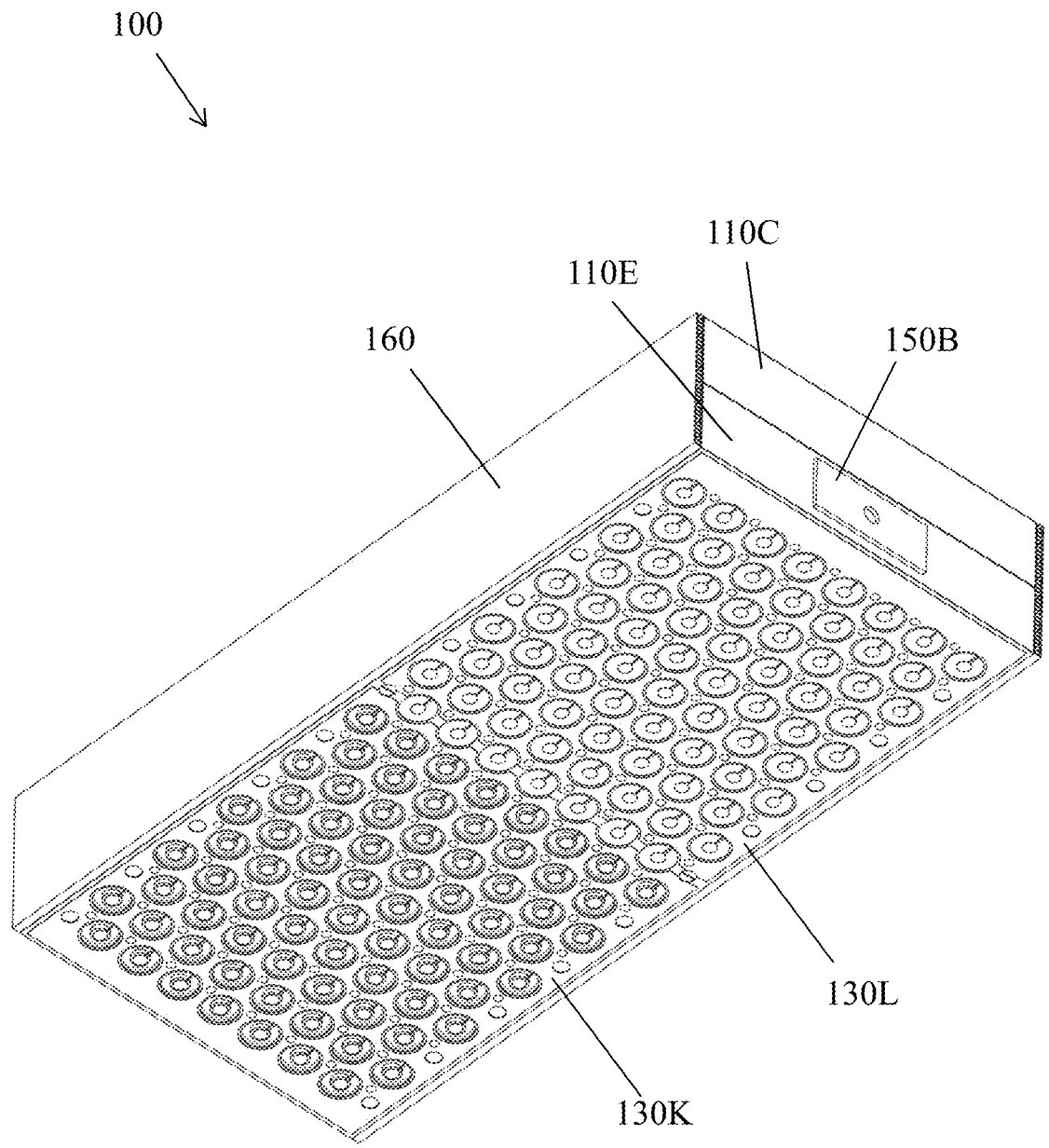
FIG. 9 is a bottom rear view of the battery module of FIG. 8, according to an aspect of the disclosure.
Figure 10:
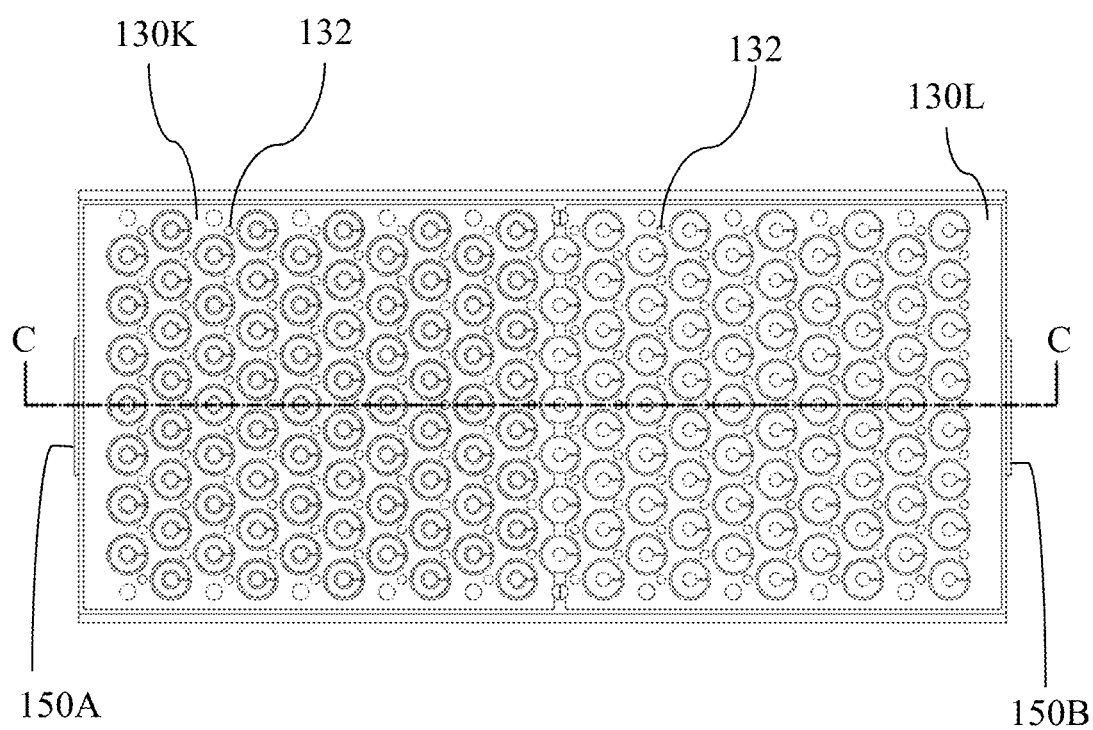
FIG. 10 is a bottom plan view of the battery module of FIG. 8, according to an aspect of the disclosure.
Figure 12:
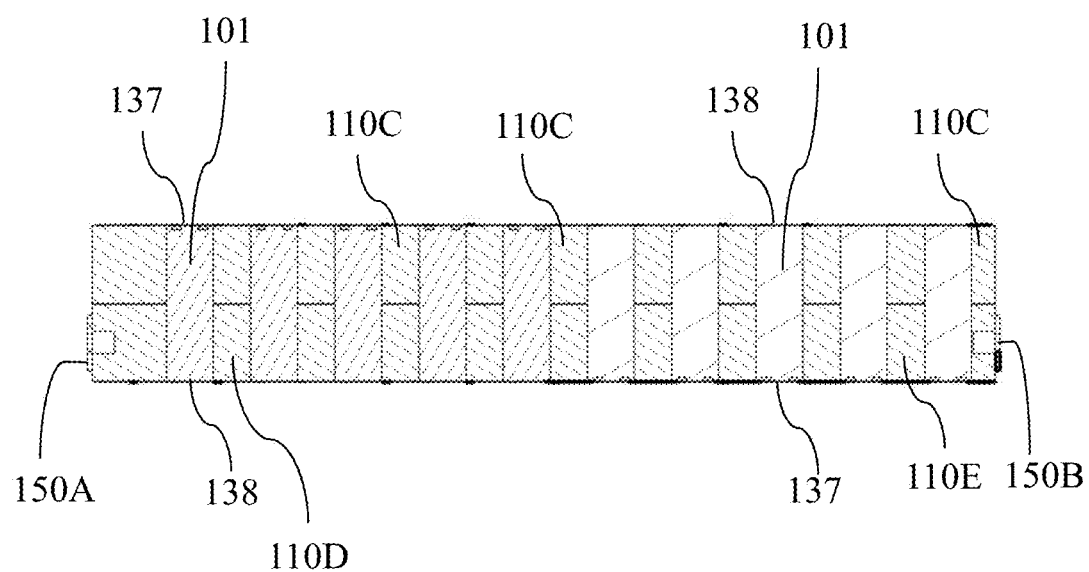
FIG. 12 is a cross-sectional view along line C-C in FIG. 10, according to an aspect of the disclosure.
Figure 13:
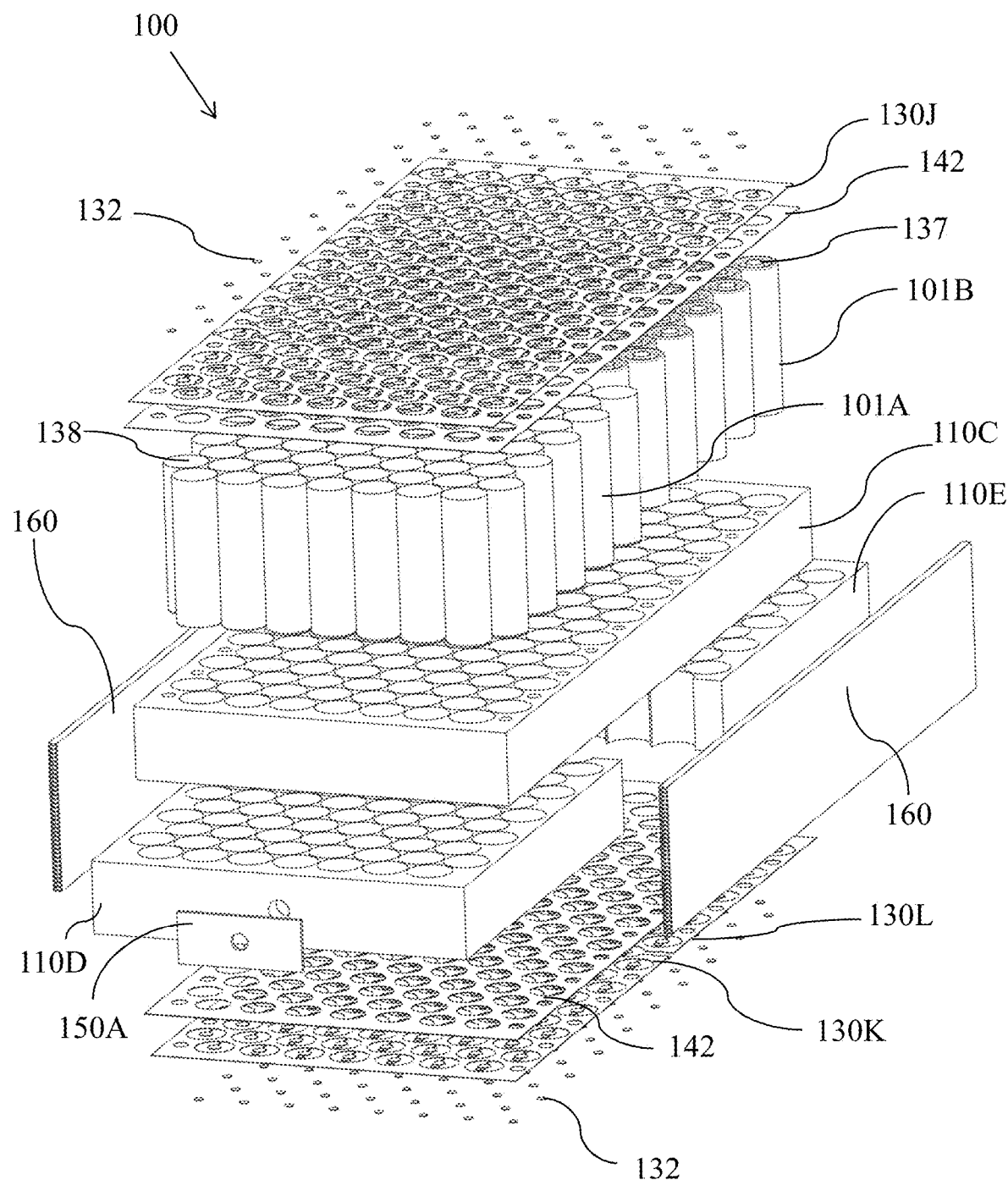
FIG. 13 is an exploded view of the battery module of FIG. 8, according to an aspect of the disclosure.

As shown in FIG. 8, the contemplated battery module 100 has a large sheet of cell interconnect 130J disposed and welded on the top side of the substrate 110C. There are two smaller sheets of cell interconnects 130K, 130L respectively disposed and welded to the bottom side of the substrates 110D, 110E (see FIGS. 9 and 13). Note that in this embodiment, each of the wells 112 of the collector is a through channel with openings on both ends of each through channel. That is, a battery cell 101 disposed in a well 112 exposes its positive terminal 137 on one side of the collector while exposing its negative terminal 138 on the opposite side of the collector (see FIG. 12). As illustrated in FIGS. 12 and 13, two groups of battery cells 101 are shown disposed in alternating orientation.

All three substrates 110C, 110D, 110E are individually sealed with a ceramic material so that while three substrates 110 are stacked together, current may not pass from one substrate 110 to the next by merely their physical interface.

The front negative terminal 150A is electrically connected to the one smaller substrate 110D in the front, while the rear positive terminal 150B is electrically connected to the other smaller substrate 110E (see FIGS. 11 and 12) in the rear.

Figure 17:
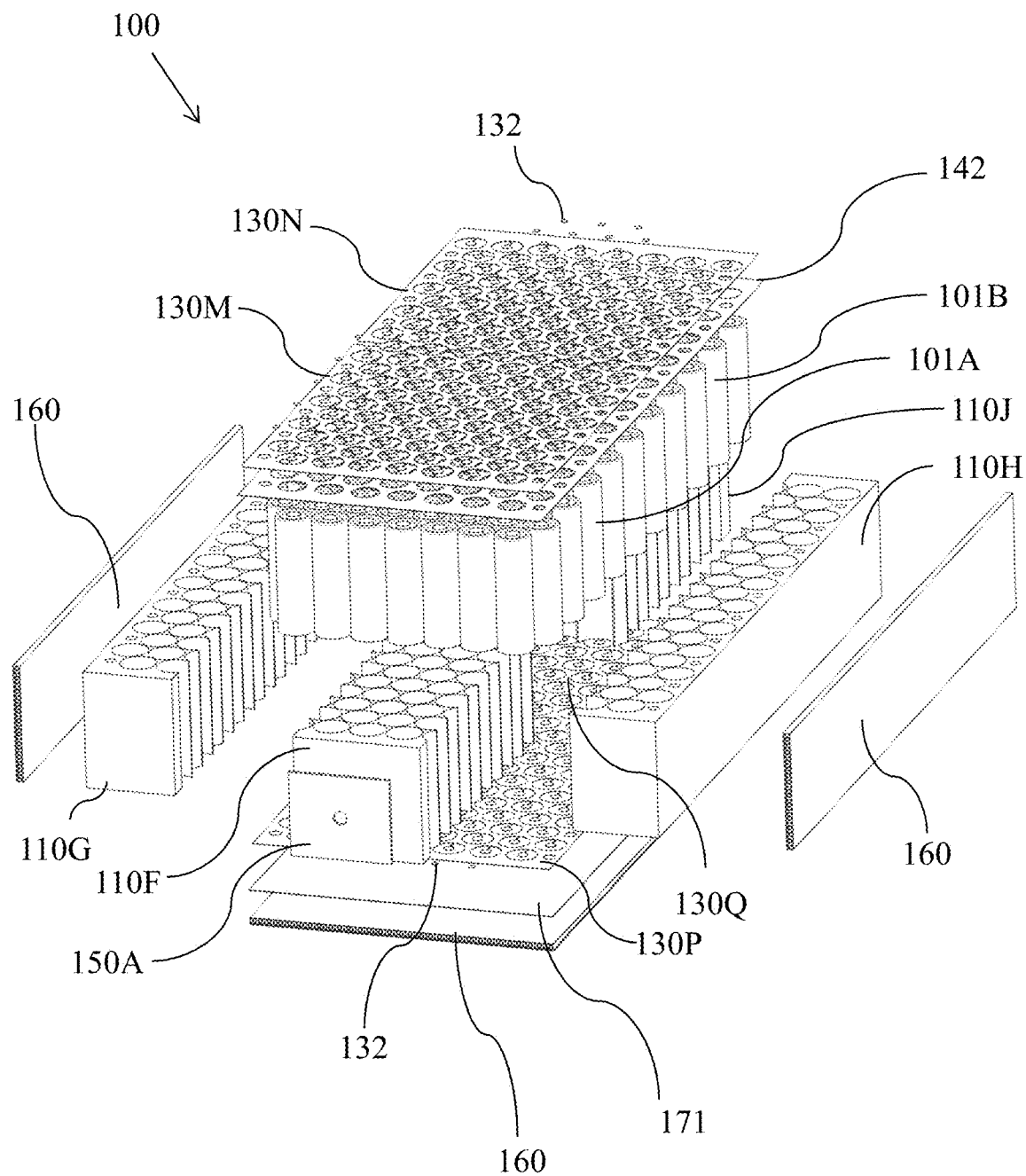
FIG. 17 is an exploded view of the battery module of FIG. 13, according to an aspect of the disclosure.

Referring now to FIG. 13, current enters the battery module 100 first via negative terminal 150A on the front side of the battery module 100. Current next travels to the smaller substrate 110D to which the negative terminal 150A is electrically attached. Because the substrate 110D is sealed with a ceramic material, current does not directly pass to the cell batteries 101 that are enveloped in the wells 112 of substrate 110D. Current then passes to the bottom cell interconnect 130K which is welded to substrate 110D. It should be noted here that the cell interconnects 130 shown in FIGS. 13 and 17 are different from that shown in FIG. 4. The cell interconnects 130 in FIGS. 13 and 17 are in a sheet form.

In one embodiment, using the contemplated collector as a structural backbone can allow for very thin interconnects 130. This can enable reel-to-reel processing by manufacturing interconnects 130 on a roll of flexible metal foil. This can also lower the cost of battery interconnects 130.

From cell interconnect 130K, current travels to the front half of the array of battery cells 101A that are electrically connected to the small front cell interconnect 130K. From the front half of the array of battery cells 101A, current travels to the large sheet of cell interconnect 130J.

Because the large sheet of cell interconnect 130J is also electrically connected the rear half array of battery cells 101B (in opposite orientation), current now passes to this rear half of battery cells 101B.

In addition to using the large sheet of cell interconnect 130J to channel current between the two halves 101A, 101B of array battery cells 101, current also passes from half array 101A to half array 101B via substrate 110C. This is because the sheet of cell interconnect 130J is welded to substrate 110C via weld points 132. Using this configuration can help prevent overstressing/overheating in the cell interconnect 130J.

The current next travels from the rear half 101B of array of batter cells 101 to the rear bottom smaller substrate 110E. Current then travels out of the battery module 100 via the rear positive terminal 150B which is electrically attached to the rear bottom smaller substrate 11E.

FIGS. 14-17 offer yet another embodiment where the collector is comprised of four substrates 110F, 110G, 110H, 110J adhered to each other. The collector has two lateral substrates 110G, 110H sandwiching two smaller (front and rear) adjacent substrates 110F, 110J (as can be seen in FIG. 17).

Figure 14:
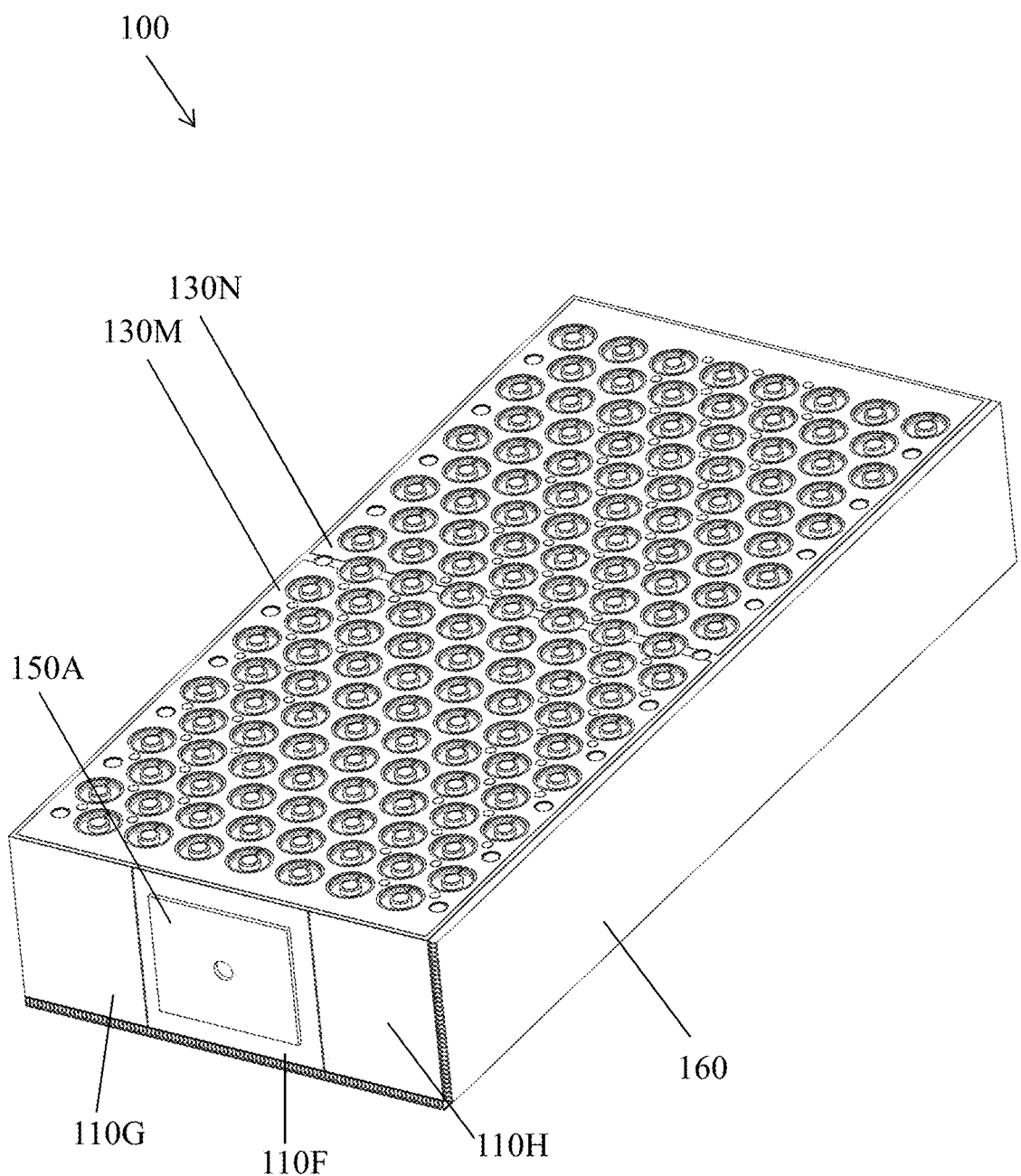
FIG. 14 is a top front perspective view of yet another embodiment of a battery module according to an aspect of the disclosure.

In FIG. 14, the contemplated battery module 100 has a collector, a front cell interconnect 130M disposed on the front top side of the collector, and a rear cell interconnect 130N also disposed on the rear top side of the collector. Cooling plates 160 are attached to the sides and bottom of the collector. The collector in this embodiment has wells 112 that are through channels similar to that shown in FIGS. 12, 13.

Figure 15A:
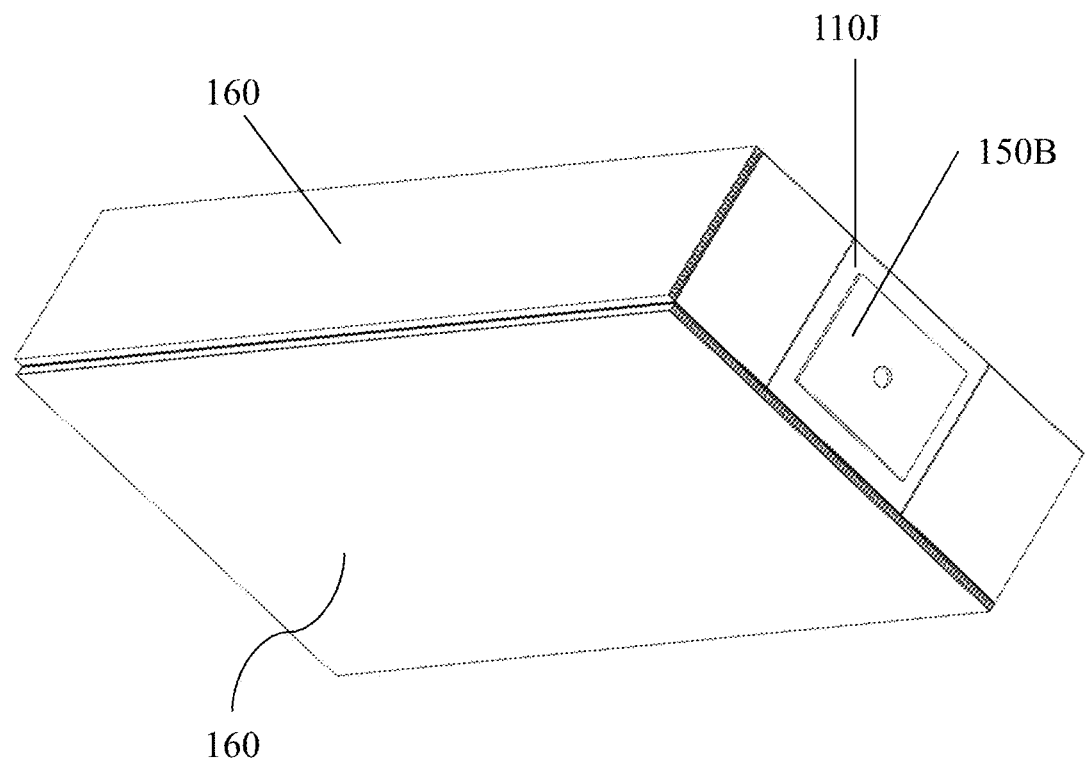
FIG. 15A is a bottom rear view of the battery module of FIG. 13, according to an aspect of the disclosure.
Figure 15B:
FIG. 15B is a side plan view of the battery module of FIG. 13, according to an aspect of the disclosure.
Figure 16:
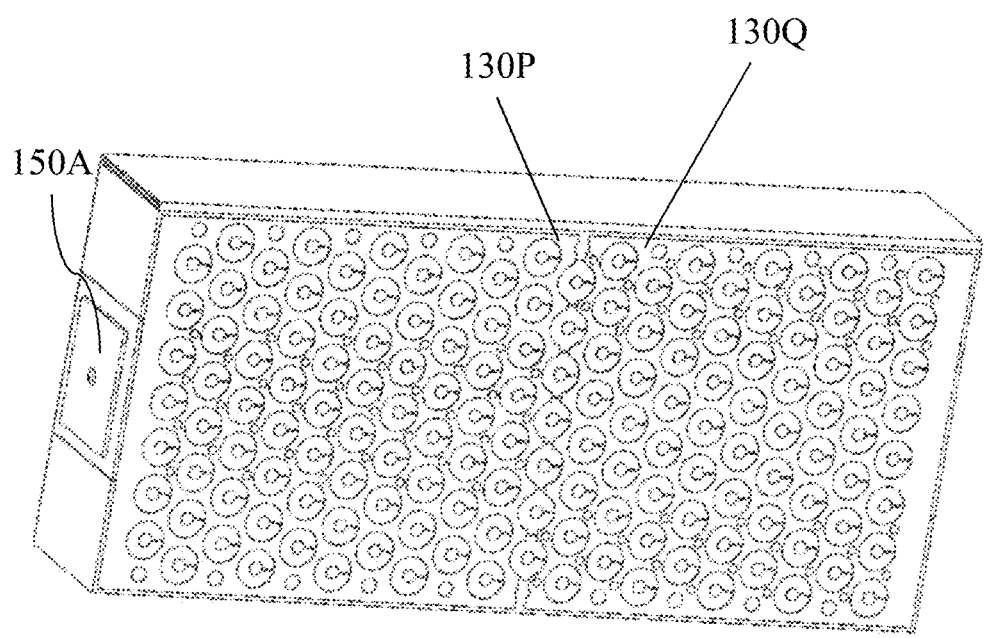
FIG. 16 is a bottom front perspective view of the battery module of FIG. 13 with the heat exchanger removed, according to an aspect of the disclosure.

A negative terminal 150A is attached to the front smaller substrate 110F. In FIG. 15A, the bottom side of the battery module has a cooling plate 160; the rear end shows a positive terminal 150B attached to the rear smaller substrate 110J. The relative positions of the two terminals 150A, 150B can be seen in FIG. 15B.

All four substrates 110 are individually sealed with a ceramic material so that while the four substrates 110 are assembled to physically touch each other, current may not pass from one substrate 110 to the next merely by their physical interface.

Referring now to FIG. 17, current enters the battery module 100 first via negative terminal 150A on the front center of the battery module 100. Current next travels to the smaller center substrate 110F to which the front negative terminal 150A is electrically coupled. Because the substrate 110F is sealed with a ceramic material, current does not directly pass to any cell batteries 101 in the system. The current then passes to the front sheet of cell interconnect 130P via weld points 132. From cell interconnect 130P, the current travels to the front half 101A of the array of battery cells 101, and through these battery cells 101A to top half cell interconnect 130M. Because cell interconnect 130M is welded to both lateral substrates 110G, 110H, the current next travels from the cell interconnect 130M to both lateral substrates 110G, 110H. From later substrates 110G, 110H, the current travels to rear sheet of cell interconnect 130N, which is welded to both substrates 110G and 110H.

It should be noted that cell interconnects 130M, 130N are separate pieces and do not touch each other. They are also not directly electrically connected. Likewise, cell interconnects 130P, 130P are separate pieces and do not touch each other. They are also not directly electrically connected.

The current next travels from cell interconnect 130N to the rear half 101B of the array of battery cells 101, and then to cell interconnect 130Q which is electrically connected to the opposite side of these battery cells 101. Because cell interconnect 130Q is welded to substrate 110J, the current next travels to the substrate 110J and then to the positive terminal 150B (not shown).

Also, a thermally conductive but electrically insulating adhesive layer can be provided between the heat exchanger 160 and the bottom side of the substrates 110F, 110G, 110H, 110J.

Most of the embodiments disclosed herein provide a collector that uses a metal foam subassembly to transfer both heat and current in a charge/discharge cycle. For example, the metal foam which makes up the substrate 110 can be part of the current pathway. In a simplified example, current passes from the negative terminal 150A→a first metal foam→cell interconnect 130→battery cells 101→a second metal foam→the positive terminal 150B. In those particular embodiments, the metal foam is a necessary part of the current pathway in a charge/discharge cycle.

It should be particularly noted that in some embodiments, the substrate 110 can merely transfer heat and does not transfer current in a charge/discharge cycle. For example, the collector can simply function as a holder of battery cells 101 to protect the battery cells 101 from outside forces and shocks and is not part of the current pathway. In a simplified example, current passes from the negative terminal 150A→cell interconnect 130→battery cells 101→the positive terminal 150B. The material that makes up the substrate 110 in these examples does not have to be electrically conductive. In one embodiment, the substrate 110 is preferred to be a dielectric material.

As described above, the contemplated material for the substrate 110 can be thermally-conductive, electrically-conductive, ductile, shock-absorbing, or any combination of these characteristics.

The shock-absorbing property of a contemplated substrate 110 can minimize or prevent the occurrence of battery cell side rupturing. The industry has in the past tried to remedy this by making battery cells with thicker walls. The contemplated substrate 110 may allow the use of thin-walled battery cells.

Figure 18:
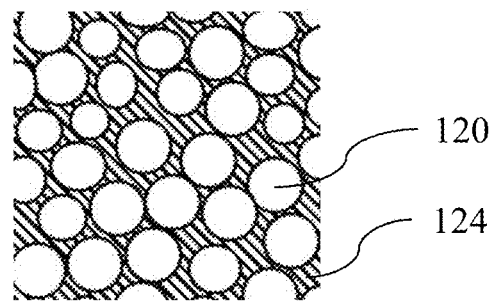
FIG. 18 illustrates a structure of a closed-cell foam.
Figure 19:
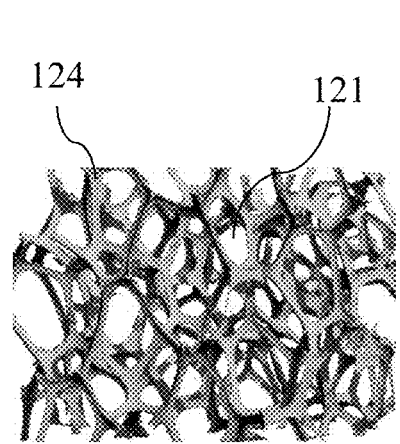
FIG. 19 illustrates a structure of an open-cell foam.

Contemplated metal foam can be a closed-cell foam as shown in FIG. 18 where a substantial number of its cells 120 in the metal body 124 are closed such that they do not interconnect with each other. Contemplated metal foam can also be an open-cell foam as shown in FIG. 19 where a substantial number of its cells 124 in the metal body 124 are open such that they interconnect with each other.

Figure 20:
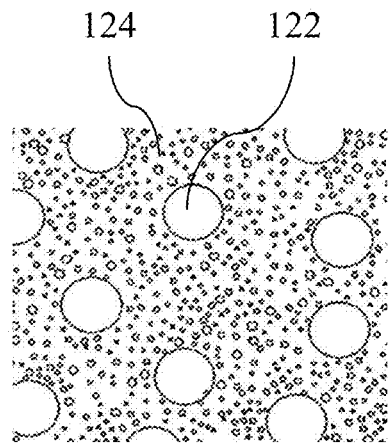
FIG. 20 illustrates a structure of metal material embedded with ceramic spheres.

Another contemplated material includes a composite, aluminum, or metal alloy material with solid or hollow high temperature ceramic spheres or glass spheres 122 embedded within the material 124 (as shown in FIG. 20). One contemplated example of making this material is to place aluminum or metal alloy through a furnace crucible chamber with ceramic hollow spheres or high temperature hollow glass spheres to produce a molten metal having hollow sphere dispersion. This molten metal can then be poured over a casting mold to create a substrate 110 having an array of wells 112.

In one particular embodiment where the metal foam has interconnecting cells (e.g., open-cell foam), there can be provided a thermal exchange medium within the interconnecting cells of the metal foam. In other words, a phase changing medium such as water can be retained within the substrate 110. In one example, the amount of water per cell can be equivalent to about 10-17 kJ of energy. When battery cells 101 go into thermal runaway the typical maximum PRM for water is about 20 kJ. In some embodiments, water level does not need to be at full height because the thermal conductivity of the substrate 110 is able to keep neighboring cells below the runaway temperature.

In one embodiment the phase-changing fluid must not be flammable. Also contemplated is for the phase changing fluid to have a boiling temperature between 65 degrees Celsius and 150 degrees Celsius.

Figure 21:
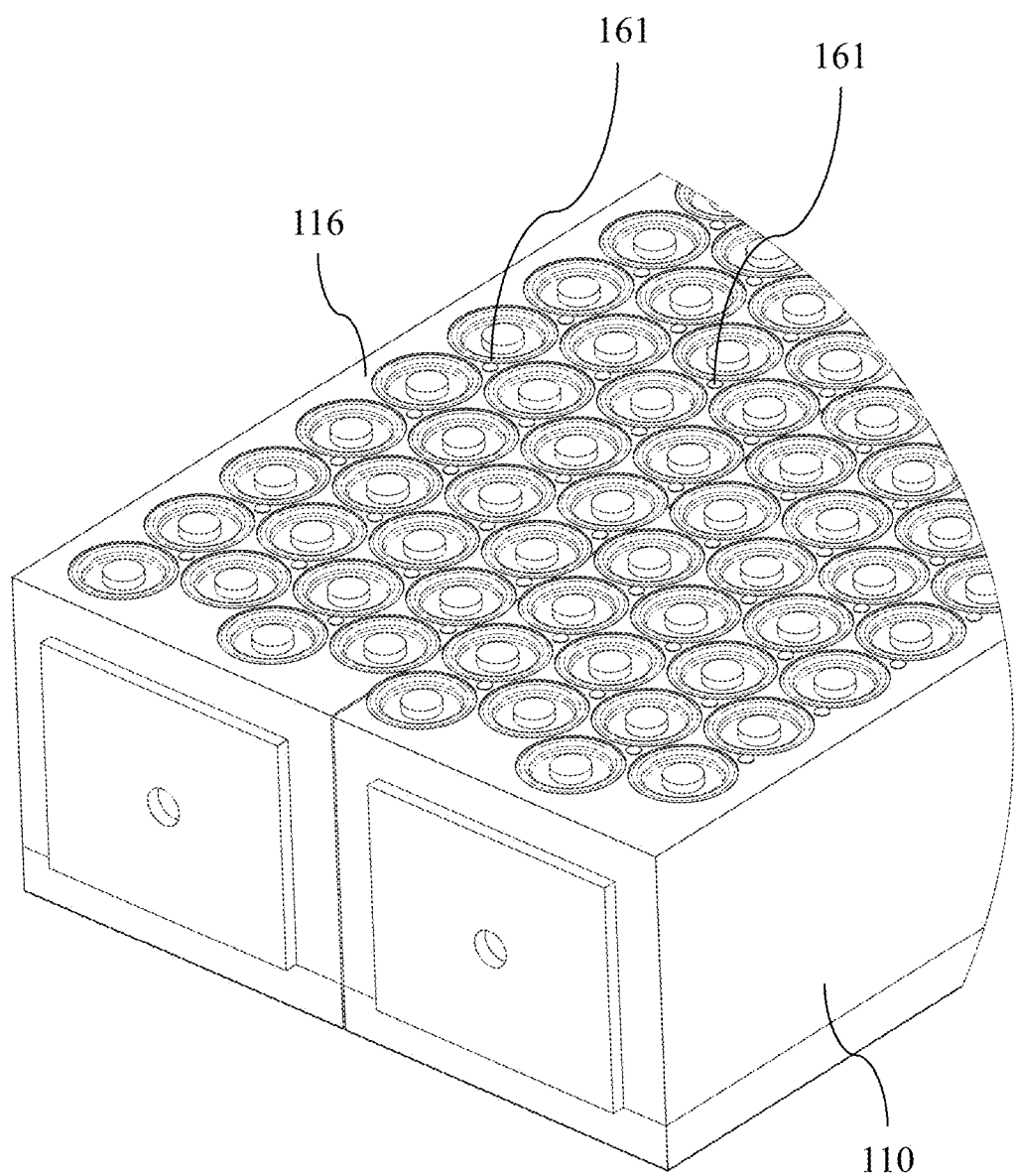
FIG. 21 is a close-up view of another embodiment of the battery module having polymeric plugs, according to an aspect of the disclosure.

In one embodiment, there can be a plurality of polymeric plugs 161 (see FIG. 21) disposed on the top surface 116 of the substrate. During a thermal event, one or more polymeric plugs 161 can melt away or burst open due to rising temperature or pressure, allowing water to evaporate through the open bore left behind by the polymeric plugs 161. Contemplated polymeric plugs 161 can be made of a low temperature polymer that would melt between 85 degree Celsius and 100 degrees Celsius and/or designed to burst at a low threshold pressure. While FIG. 21 shows an array of polymeric plugs 161 correlating to the array of the wells 112, in one embodiment, the array of polymeric plugs 161 serves to ventilate a single volume of fluid. Alternatively, many fewer plugs 161 are also contemplated.

Alternatively or optionally, there can be a vapor space either within the substrate 110 or above the substrate 110 where water vapor accumulates and there can be a single relief valve that allows vapor to escape from the vapor space.

In yet another embodiment, the vaporizing action at a specific location where a polymeric plug 161 has melted during a large thermal event can create a vacuum and pull more water into the hot spot. This design can work particularly well when there is an array of polymeric plugs 161.

Figure 22:
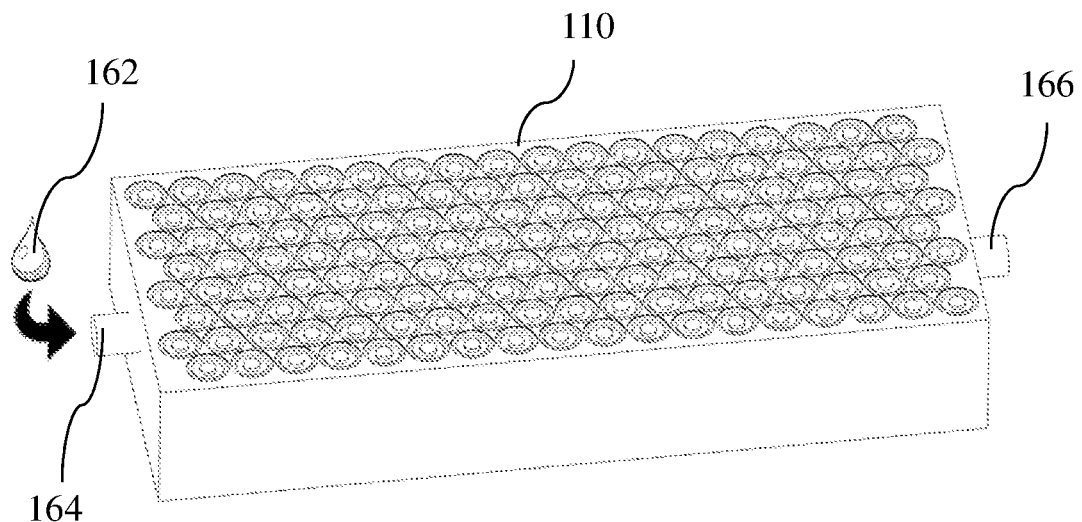
FIG. 22 is a perspective view of a further embodiment of the battery module having a fluid inlet and a fluid outlet, according to an aspect of the disclosure.
Figure 23:
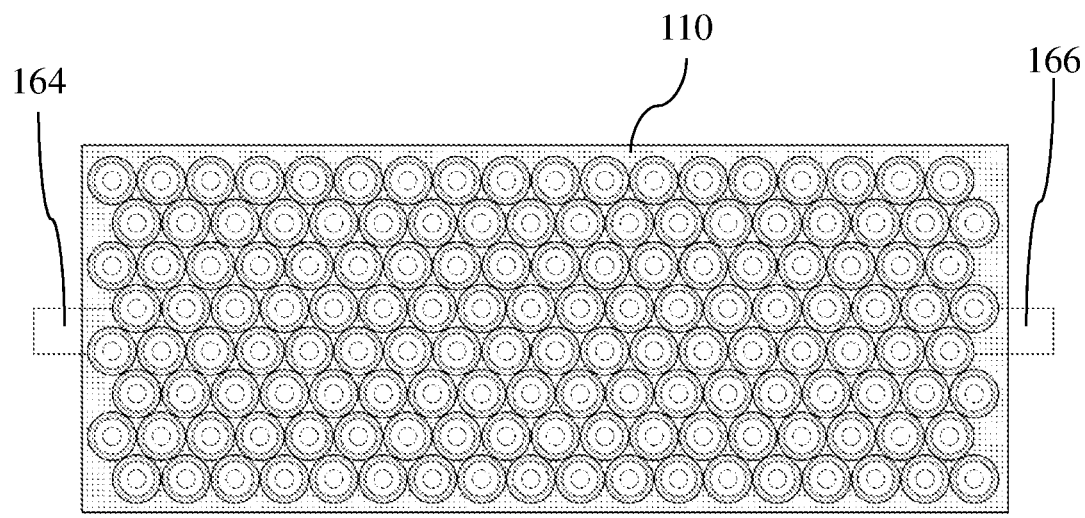
FIG. 23 is a top view of the battery module of FIG. 22, according to an aspect of the disclosure.
Figure 24:
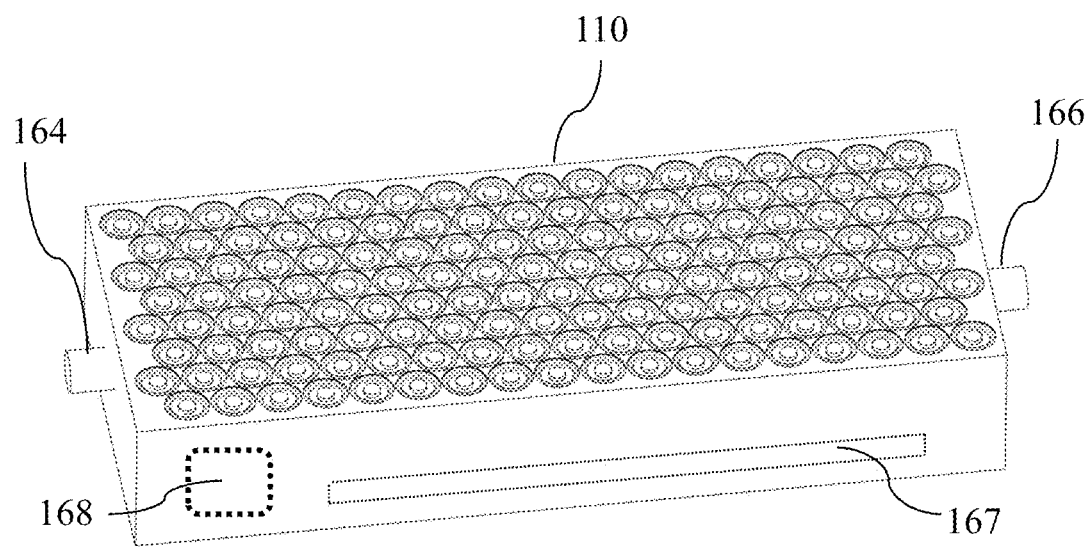
FIG. 24 is a perspective view of a further embodiment of the battery module having a fluid inlet, a fluid outlet, an internal chamber, and an internal channel, according to an aspect of the disclosure.

Referring now to FIGS. 22-24, simplified versions of the battery module are illustrated where terminals 150A, 150B are not shown. In these embodiments, there can be a fluid inlet 164 and a fluid outlet 166 allowing a thermal exchange medium 162 to pass through the interior space of substrate 110. This can be achieved by using metal foam having open cells (as shown in FIG. 19). Metal foam having open cells with diameters between 1 mm and 5 mm are contemplated. Suitable thermal exchange medium 162 can be pushed through the substrate 110 thereby cooling the substrate 110 and battery cells 101. One way to achieve this effectively is to have empty chambers 168, connecting channels 167, or both on the interior of the substrate 110 to facilitate passage of thermal exchange fluid from fluid inlet 164 to fluid outlet 166. For example, there can be an empty chamber 168 near the inlet 164 and an empty chamber 168 near the outlet 166 to facilitate better flow distribution throughout the metal foam.

In yet other embodiments, the substrate 110 can be prepared by properly lining each well 112 and all exposed surfaces of the substrate 110 to ensure that no leakage of thermal exchange fluid would occur. For example, a 3003 aluminum alloy sleeve can be placed into each well 112 of the substrate 110 by pressure and every surface 114, 115, 116, 117 of the substrate 110 is covered by a plate that is comprised of 4004 series clad to 3003 series AL. Then the 4004 can be melted to seal the entire interior volume of the substrate 110.

In another embodiment, the heat exchanger 160 is then coated with a high voltage coating capable of 4500 VDC break down and with high insulation resistance (e.g., >10 Gohm per cell interface). This coating can also be a high thermal conductivity coating.

Thus, specific embodiments and applications of an intracellular device for lithium ion batteries have been disclosed. It should be apparent, however, to those skilled in the art that many more modifications besides those already described are possible without departing from the disclosed concepts herein. These disclosed embodiments, therefore, are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . . and N, the text should be interpreted as requiring at least one element from the group which includes N, not A plus N, or B plus N, etc.

What is claimed is:

1. A battery module comprising:
   a first prefabricated thermally conductive substrate having a top surface;
   an array of wells disposed on at least one side of the first substrate;
   a plurality of battery cells each of which is at least partially enveloped within each of said well of the plurality of wells to propagate heat away from said plurality of battery cells;
   a dielectric sealant disposed between each of said plurality of battery cells and each of said respective well to electrically insulate a wall of each battery cell from the first prefabricated thermally conductive substrate;
   a first cell interconnect disposed above the first substrate and is electrically connected to the plurality of battery cells;
   wherein the first substrate is comprised of an electrically conductive material, and both the first terminal and the first cell interconnect are electrically coupled to the first substrate;
   a venting space disposed above the plurality of battery cells; and
   a first terminal electrically coupled to the first cell interconnect.

2. The battery module as recited in claim 1 further comprising a second thermally conductive substrate coupled to the first substrate, a layer of dielectric and thermally conductive material disposed between said first substrate and said second substrate, and a second terminal electrically coupled to the second substrate.

3. The battery module as recited in claim 2, wherein the second substrate is comprised of an electrically conductive material.

4. The battery module as recited in claim 1, wherein each said battery cell has a side wall, and an entire length of each side wall of the battery cell is enclosed within each said well.

5. The battery module as recited in claim 1, wherein the venting space is an enclosed venting space having a port.

6. The battery module as recited in claim 3, wherein the electrically conductive material of said first and second substrates is a metal foam and the layer of dielectric and thermally conductive material is ceramic or a high temperature polymer.

7. The battery module as recited in claim 6, wherein the metal foam is closed-cell aluminum metal foam.

8. The battery module as recited in claim 6, wherein the metal foam is open-cell aluminum metal foam.

9. The battery module as recited in claim 3 further comprising a heat exchanger coupled to at least one of said first substrate and second substrate, wherein the electrically conductive material of said first and second substrate has a plurality of ceramic spheres embedded within.

10. The battery module as recited in claim 1, and wherein said first substrate is an open-cell metal foam having interconnecting cells, further comprising a thermal exchange medium disposed within the interconnecting cells.

11. The battery module as recited in claim 10 further comprising a fluid inlet and a fluid outlet disposed on the first substrate, further comprising at least one fluid channel or at least one chamber disposed within said first substrate and is fluidly-connected to the interconnecting cells.

12. The battery module as recited in claim 1, wherein the first substrate is a gas barrier such that a portion of each battery cell enveloped within each well is prevented from exposure to gas impingement from the venting space.

13. The battery module as recited in claim 1, wherein the sealant is a gas barrier layer, wherein the gas barrier layer is a layer of ceramic or high temperature polymer covering at least the top surface of the first substrate.

14. The battery module as recited in claim 1 further comprising a gas barrier layer, wherein the gas barrier layer is separable from the first substrate and is disposed on top of the interconnect to isolate a side wall of each battery cell from the venting space.

15. A method of protecting a plurality of battery cells contained within the battery module of claim 1, the method comprising:
   prefabricate a collector from a thermally conductive material;
   prefabricate a plurality of wells in said collector, each of said wells is to receive each of said plurality of battery cells;
   coat an inside wall of each of said plurality of wells with a dielectric sealant to electrically insulate said plurality of wells from a wall of each of said plurality of battery cells;
   place each of said plurality of battery cells into each of said plurality of wells;
   isolate at least a substantial portion of a side wall of each battery cell from a venting space to prevent gas impingement on an intercellular space; and
   transfer heat from each battery cell to a thermal exchange medium via the collector by providing sufficient contact between each battery cell and a wall of each well.

16. The method as recited in claim 15 wherein the thermally conductive material of the collector is also electrically conductive, and further comprising using the collector as part of a current pathway during a charge/discharge cycle.

17. The method as recited in claim 15 further comprising structurally protecting said plurality of battery cells by enclosing said battery cells with said thermally conductive material, wherein said thermally conductive material contains a shock-absorbing material, and wherein the shock-absorbing material is a metal foam.

18. The method as recited in claim 16, wherein the thermally conductive material of the collector is a metal foam, and the prefabrication step including covering the metal foam with a thermally conductive, dielectric material.

19. The method as recited in claim 17 further comprising electrically coupling a first terminal and a first cell connector to the collector, and electrically coupling the first cell connector to the array of battery cells, thereby allowing current to pass from said first terminal to said first collector, then to said first cell connector, and then to said array of battery cells.

20. The method as recited in claim 15 further comprising coupling a heat exchanger to the collector.

21. The method as recited in claim 15, wherein the thermally conductive material is a metal foam having interconnecting cells, further comprising enclosing a phase-changing fluid in the interconnecting cells and allowing at least a portion of the phase-changing fluid to evaporate from the interconnecting cells during a thermal runaway event in at least one of said plurality of batter cells.

22. The method as recited in claim 15, wherein the thermally conductive material is a metal foam having interconnecting cells, further comprising cooling the thermally conductive material by running a thermal exchange medium through the interconnecting cells.

23. The method as recited in claim 15, wherein the prefabrication step includes partitioning the collector with a layer of dielectric material, or a layer of thermal barrier, or both.

* * * * *